(12) United States Patent
Haar

(10) Patent No.: US 9,441,612 B2
(45) Date of Patent: Sep. 13, 2016

(54) TRANSPORTABLE SYSTEM FOR SELF-CONTAINED ENERGY MICRO-GRID WITH WIND TURBINE

(71) Applicant: Jonathan Haar, Cambridge, MA (US)

(72) Inventor: Jonathan Haar, Cambridge, MA (US)

( * ) Notice: Subject to any disclaimer, the term of this patent is extended or adjusted under 35 U.S.C. 154(b) by 62 days.

(21) Appl. No.: 14/616,024

(22) Filed: Feb. 6, 2015

(65) Prior Publication Data
US 2015/0300321 A1 Oct. 22, 2015

Related U.S. Application Data

(60) Provisional application No. 61/980,833, filed on Apr. 17, 2014.

(51) Int. Cl.
*F03D 9/00* (2016.01)
*F03D 3/00* (2006.01)

(52) U.S. Cl.
CPC ............... *F03D 9/003* (2013.01); *F03D 3/005* (2013.01); *F05B 2240/91521* (2013.01); *F05B 2240/94* (2013.01); *Y02E 10/728* (2013.01)

(58) Field of Classification Search
CPC ..... F01M 11/0458; B65D 85/00; Y02E 10/723; Y02E 10/725; Y02E 60/12; H01G 7/023
USPC .......................................... 29/592.1; 206/223
See application file for complete search history.

(56) References Cited

U.S. PATENT DOCUMENTS

| | | | | |
|---|---|---|---|---|
| 4,117,342 A * | 9/1978 | Melley, Jr. | ................ | B60P 3/00 290/1 A |
| 4,261,329 A * | 4/1981 | Walsh | ....................... | B60P 3/00 126/569 |
| 4,633,767 A * | 1/1987 | Sain | .......................... | B60L 1/00 136/291 |
| 4,894,764 A * | 1/1990 | Meyer | ....................... | H02J 3/32 307/38 |
| 5,336,933 A * | 8/1994 | Ernster | ................... | F03D 3/005 290/44 |
| 5,379,596 A * | 1/1995 | Grayson | ............... | F25B 27/002 136/245 |
| 5,920,127 A | 7/1999 | Damron et al. | | |
| 6,388,869 B1 * | 5/2002 | Fauteux | ................... | H02B 1/52 307/150 |
| 6,877,581 B2 * | 4/2005 | Badr | ......................... | B60P 3/00 180/311 |

(Continued)

OTHER PUBLICATIONS

Eastern Wind Power Inc. Mobile Turbine Unit. Mar. 2, 2013, [retrieved on Apr. 9, 2014]. Retrieved from internet; <URL: http://easternwindpower.us/about/mobileturbineunit>; figures 1-2; paragraphs 3-8 (3 pages).

(Continued)

*Primary Examiner* — Tulsidas C Patel
*Assistant Examiner* — Charles Reid, Jr.
(74) *Attorney, Agent, or Firm* — Hovey Williams LLP

(57) ABSTRACT

An energy unit capable of being configured in a transportation configuration and in an operational configuration. The unit comprises a container having first and second ends opposing a longitudinally-extending central section. In the transportation configuration, the container's central section is positioned generally parallel with a supporting ground surface. In the operational configuration the container is configured to be positioned with the first end on the supporting ground surface such that the second end is set apart in an upward direction from the supporting ground surface. The energy unit additionally comprises a wind turbine for generating electrical energy. In the operational configuration, the wind turbine is configured to be received within the interior space of the container, while in the transportation configuration the wind turbine is configured to extend from the exterior surface of the container.

19 Claims, 14 Drawing Sheets

(56) References Cited

U.S. PATENT DOCUMENTS

| | | | |
|---|---|---|---|
| 7,499,263 B2* | 3/2009 | Herbstritt | H02B 1/52 290/1 R |
| 8,299,645 B2 | 10/2012 | Muchow et al. | |
| 8,854,794 B2* | 10/2014 | Van Straten | F24J 2/523 290/44 |
| 2002/0105190 A1* | 8/2002 | Thomas | F03D 3/02 290/55 |
| 2006/0137348 A1* | 6/2006 | Pas | F03D 9/007 60/641.1 |
| 2008/0196758 A1* | 8/2008 | McGuire | F03D 9/007 136/245 |
| 2008/0231052 A1* | 9/2008 | Farmer | B60K 16/00 290/52 |
| 2010/0140949 A1 | 6/2010 | Pitre et al. | |
| 2010/0207452 A1* | 8/2010 | Saab | F03D 1/005 307/65 |
| 2010/0230972 A1* | 9/2010 | Haar | F03D 3/02 290/55 |
| 2011/0133474 A1* | 6/2011 | Haar | F03D 3/06 290/55 |
| 2012/0051913 A1* | 3/2012 | Haar | F03D 3/02 416/146 R |

OTHER PUBLICATIONS

3XE Energy Storage. "3xE energy storage solutions" Nov. 2012, [retrieved on Apr. 13, 2014], retrieved from internet; <URL: http://3xe-electric-cars.com/downloads/3xE_-_electric_cars_-_Energy_Storage_Solutions.pdf>: p. 3 (7 pages).

International Search Report and Written Opinion in corresponding PCT Application No. PCT/US15/14803 filed Feb. 6, 2015, mailed Jun. 29, 2015 (15 pages).

\* cited by examiner

TRANSPORTABLE SYSTEM FOR SELF-CONTAINED ENERGY MICRO-GRID WITH WIND TURBINE

RELATED APPLICATIONS

This non-provisional patent application claims priority benefit to U.S. provisional patent application Ser. No. 61/980,833 filed on Apr. 17, 2014, and entitled "TRANSPORTABLE KIT AND SYSTEM FOR SELF-CONTAINED ENERGY MICRO-GRID WITH WIND TURBINE," the entire disclosure of which is herein incorporated by reference.

FIELD OF THE INVENTION

The present invention relates to energy micro-grid units. More particularly, the invention relates to transportable, self-contained energy micro-grid units.

BACKGROUND

The need for stable and reliable electrical power is an absolute requirement for maintaining health, safety, and other standards of living in today's societies. The need for stable and reliable electrical power can be particularly important at "energy islands" isolated from conventional grid power, such as at disaster relief sites, rural and remote communities and farms, tropical resorts, military forward bases, and other sites where the electrical grid system is inadequate or unavailable, or where renewable energy is desired. There have been some mobile power stations developed that can be used to provide power to such sites. However, the disadvantage of such known mobile power stations is that they incorporate the use fossil fuels, such as diesel fuel, as the primary motivator for generating electrical power. The use of fossil fuels is problematic in that the fuel is a limited commodity, such that when the stockpile of diesel fuel is exhausted, the mobile power stations are useless. Furthermore, during the combustion of fuels, harmful and/or undesirable exhaust gases are produced and released into the environment. In the case of military application, men's lives are at risk in the delivery of non-renewal fuel to combat areas, and the storing of flammable liquid fuels in such locations is problematic. There have been developed some mobile power stations that incorporate the use of sustainable energy sources, such as wind power and solar power. However, the design of such known mobile power stations does not maximize the energy conversion rate of such sustainable energy sources. In addition, such known mobile power stations do not provide for a simple and quick assembly of the power stations in a multitude of applications. Furthermore, known mobile power stations do not provide for the ability to link individual systems together to create a more robust micro-grid or electrical storage system.

SUMMARY

The present invention solves the above-described problems and provides a distinct advance in the art of energy micro-grids. More particularly, the present invention provides an energy micro-grid that incorporates several unique features that enable the energy micro-grid to provide a sustainable source of energy without the need for fossil fuels. Additionally, embodiments of the present invention incorporate features to efficiently maximize the conversion rate of sustainable energy sources beyond that previously possible.

One embodiment of the present invention broadly includes an energy unit capable of being configured in a transportation configuration and in an operational configuration. The unit comprises a container having first and second ends opposing a longitudinally-extending central section. The container additionally presents an exterior surface and an interior space. In the operational configuration, the container is configured to be positioned with the first end on a supporting ground surface such that the second end is set apart in an upward direction from the supporting ground surface. The energy unit additionally comprises a wind turbine for generating electrical energy from wind. The wind turbine includes a central shaft having a lower portion and an upper portion. The central shaft is configured to be received within the interior space of the container in the transportation configuration and configured to extend from the exterior surface of the container in the operational configuration. The wind turbine additionally includes at least one rotor blade configured to be received within the container in the transportation configuration and configured to be secured to the central shaft in the operational configuration. Furthermore, the wind turbine includes a generator configured to be received within the container in the transportation configuration and configured to be associated with the central shaft in the operational configuration.

Another embodiment of the present invention includes energy micro-grid system that comprises at least two energy units operable to be configured in a transportation configuration and in an operational configuration. Each of the energy units includes a container presenting an exterior surface and an interior space, and a wind turbine for generating electrical energy from wind. The wind turbine is configured to be received within the interior space of the container in the transportation configuration and configured to extend from the exterior surface of the container in the operational configuration. The energy micro-grid system additionally comprises a battery storage unit electrically connected to each of the energy units, such that the battery storage unit is configured to store at least a portion of the electrical energy generated by the wind turbines.

Embodiments of the present invention additionally include a method for transitioning an energy unit from a transportation configuration to an operational configuration. The method includes the initial step of providing a container having first and second ends opposing a longitudinally-extending central section, with the container being configured to house wind turbine components. A next step includes positioning the container in the transportation configuration such that its central section is orientated generally parallel with a supporting ground surface. A next step includes securing the wind turbine components to an exterior of the container such that the wind turbine components extend from the second end of the container. A further step includes shifting the energy unit from the transportation configuration to the operational configuration such that the container's central section is orientated generally perpendicular with the supporting ground surface and such that the first end of the container is positioned on the supporting ground surface.

Another embodiment of the present invention includes a lifting system for lifting an energy unit from a transportation configuration to an operational configuration. The energy unit includes a container having first and second ends opposing a longitudinally-extending central section. In the operational configuration the container is configured to be positioned with the first end on a supporting ground surface such that the second end is set apart in an upward direction from the supporting ground surface. The lifting system comprises a winch assembly configured to be securely engaged with the supporting ground surface, and a longitudinal support beam having a first end and a second end and operable to be positioned between the winch assembly and the container. The lifting system additionally includes a pivot assembly configured to be securely engaged with a supporting ground surface, with the pivot assembly being configured to be rotatably engaged with the first end of the longitudinal support beam such that the support beam can pivot about the pivot assembly. Furthermore, the lifting system includes a mechanical link having a first end secured to the winch assembly, a second end configured to be secured to the container, and a central section extending between the first and second end, with a portion of the central section being slidably engaged with the support beam.

Furthermore, embodiments of the present invention include a method for providing electrical energy to remote locations. The method comprises the initial step of providing an energy generation system. The energy generation system includes two or more energy generation units that each includes a wind turbine for generating electrical energy. The energy generation system also includes a mobile energy storage unit electrically connected to each of the energy generation units. The method includes an additional step of positioning the energy generation units and the mobile energy storage unit at a first location. An additional step of the method includes operating the energy generation units such that electrical energy generated by the wind turbines is stored in the mobile energy storage unit. An additional step of the method includes disconnecting the mobile energy storage unit from the energy generation units. An additional step of the method includes transporting the mobile energy storage unit to a second location set apart from the first location. A further step of the method includes connecting the mobile energy storage unit to a load at the second location for using the electrical energy stored in the mobile energy storage unit.

This summary is provided to introduce a selection of concepts in a simplified form that are further described below in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein.

Figure 1:
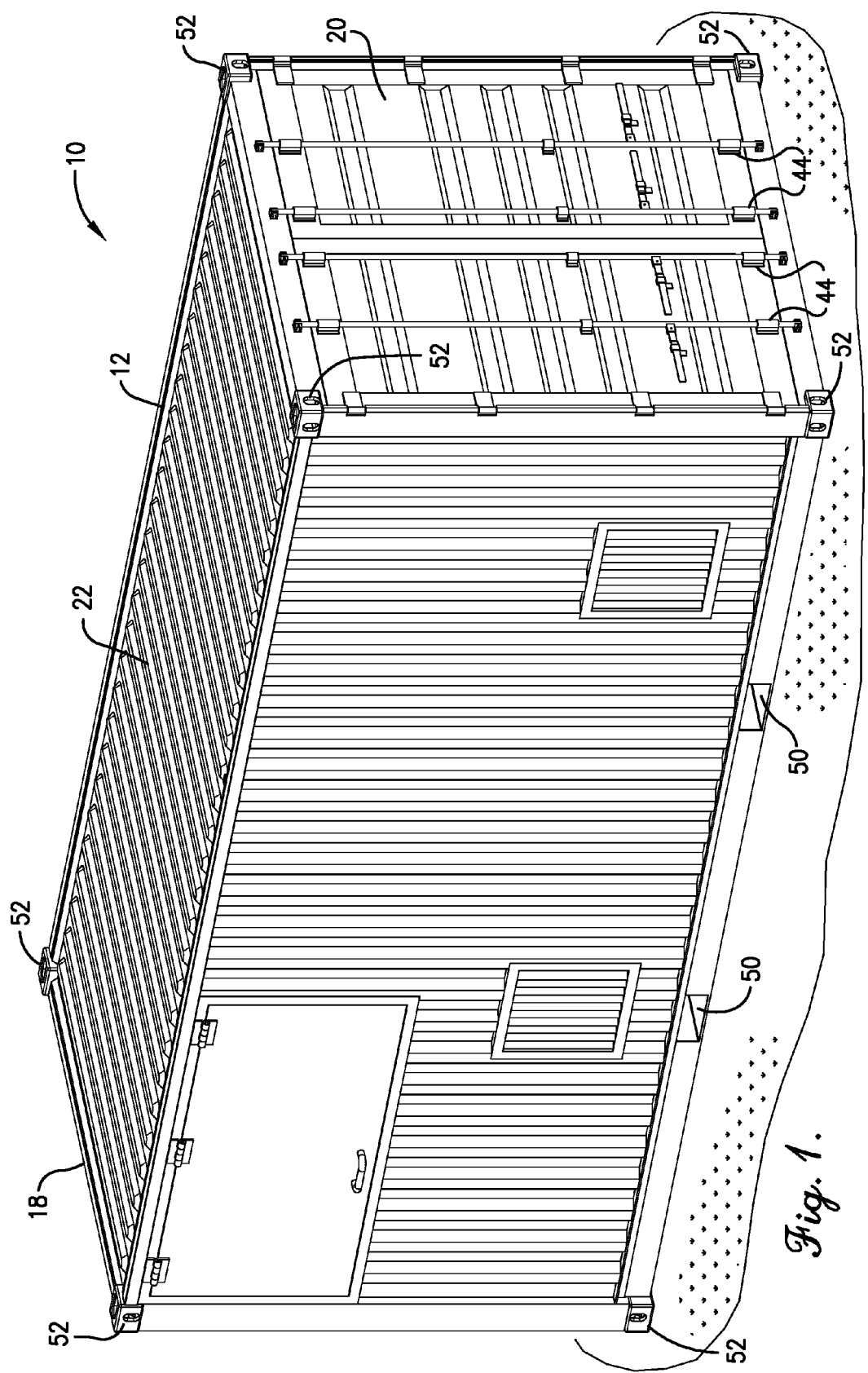
FIG. 1 is an isometric view illustrating an energy microgrid unit (EMGU) in a transportation configuration, as constructed in accordance with an embodiment of the present invention.

The drawing figures do not limit the present invention to the specific embodiments disclosed and described herein. The drawings are not necessarily to scale, emphasis instead being placed upon clearly illustrating the principles of the technology.

DETAILED DESCRIPTION

The following detailed description of various embodiments of the present technology references the accompanying drawings which illustrate specific embodiments in which the technology can be practiced. The embodiments are intended to describe aspects of the technology in sufficient detail to enable those skilled in the art to practice them. Other embodiments can be utilized and changes can be made without departing from the scope of the technology. The following detailed description is, therefore, not to be taken in a limiting sense. The scope of the present technology is defined only by the appended claims, along with the full scope of equivalents to which such claims are entitled.

Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

Figure 2:
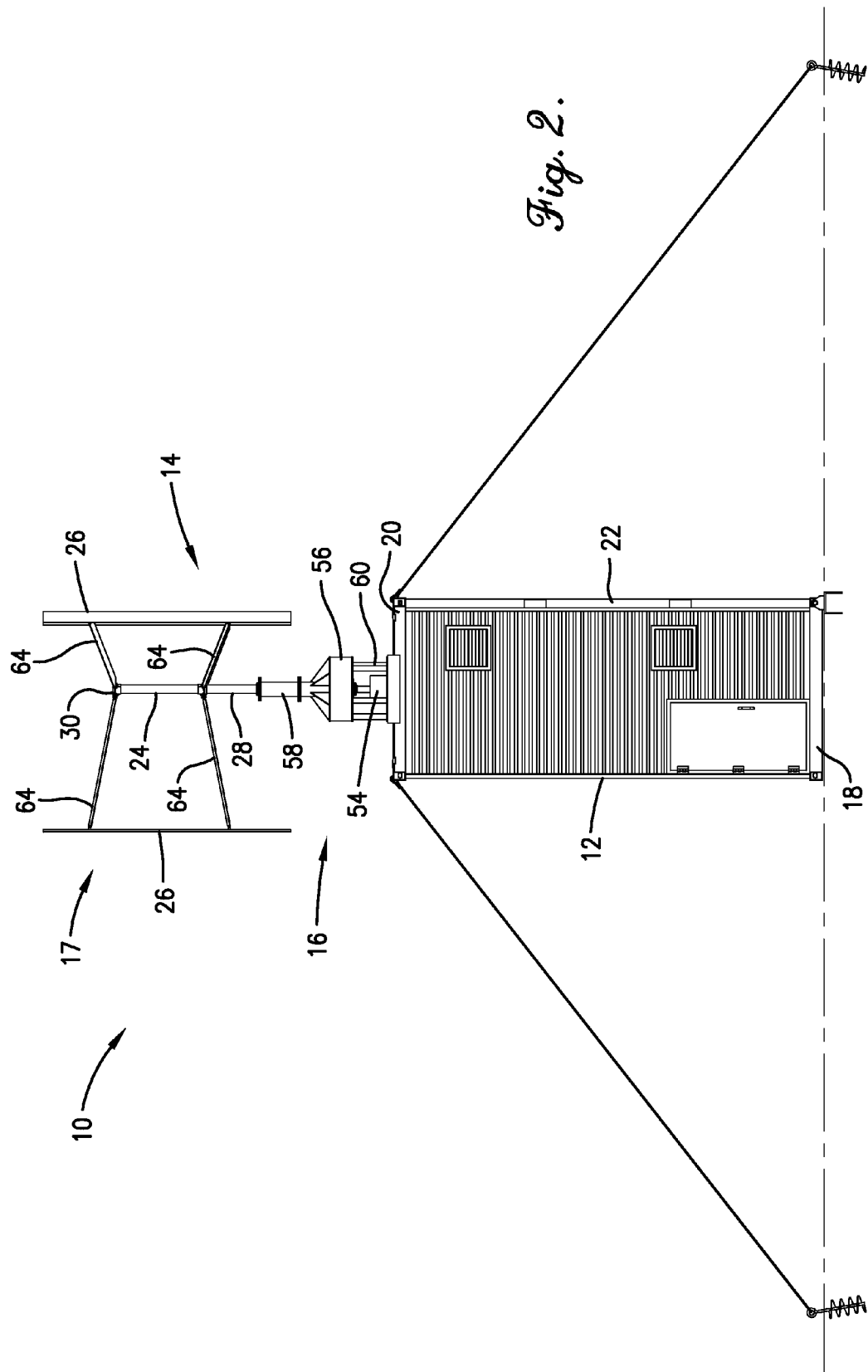
FIG. 2 is an elevational view of the EMGU from FIG. 1 in an operational configuration.

Turning now to the drawing figures, and particularly FIGS. 1-2, an energy micro-grid unit (EMGU) 10 constructed in accordance with embodiments of the present invention is illustrated. The EMGU 10 is capable of being configured in a transportation configuration (e.g., FIG. 1) and in an operational configuration (e.g., FIG. 2) and broadly comprises a container 12 and a wind turbine 14 that includes a generator assembly 16 and a rotor assembly 17. The EMGU may incorporate various types of wind turbines, such as the vertical axis wind turbines described in U.S. Pat. Nos. 7,988,413, 8,373,294, 8,258,647, 8,376,688, 8,030,792, and 8,648,483, each of which are herein incorporated by reference herein in their entireties.

In more detail, the container 12 presents an exterior surface and an interior space and includes a first end 18 and a second end 20, with such ends 18, 20 opposing a longitudinally-extending central section 22. As such, the container 12 is operable to transition from the transportation configuration (e.g., FIG. 1), in which the central section 22 is generally parallel with a supporting ground surface, to the operational configuration (e.g., FIG. 2), in which the central section 22 is generally perpendicular with the supporting ground surface and in which the first end 18 is positioned on the supporting ground surface and the second end 20 is set apart in an upward direction from the supporting ground surface. Additionally, the generator assembly 16 is configured to be received within the interior space of the container 12 in the transportation configuration and configured to be secured to the exterior surface of the container 12 in the operational configuration. Furthermore, the rotor assembly 17 includes a central shaft 24 supporting one or more rotor blades 26, with the central shaft 24 having a lower portion 28 and an upper portion 30. The rotor assembly 17 is configured to be received within the interior space of the container 12 in the transportation configuration and is configured to have the lower portion 28 of the central shaft 24 secured to the generator assembly 16 in the operational configuration. As such, the EMGU 10 is configured, in the transportation configuration, to be a transportable and self-contained unit. Further, the EMGU 10 is capable of transitioning from the transportation configuration to the operational configuration, such that the EMGU 10 is capable of operating as a transportable source for reliable, sustainable energy.

Figure 3:
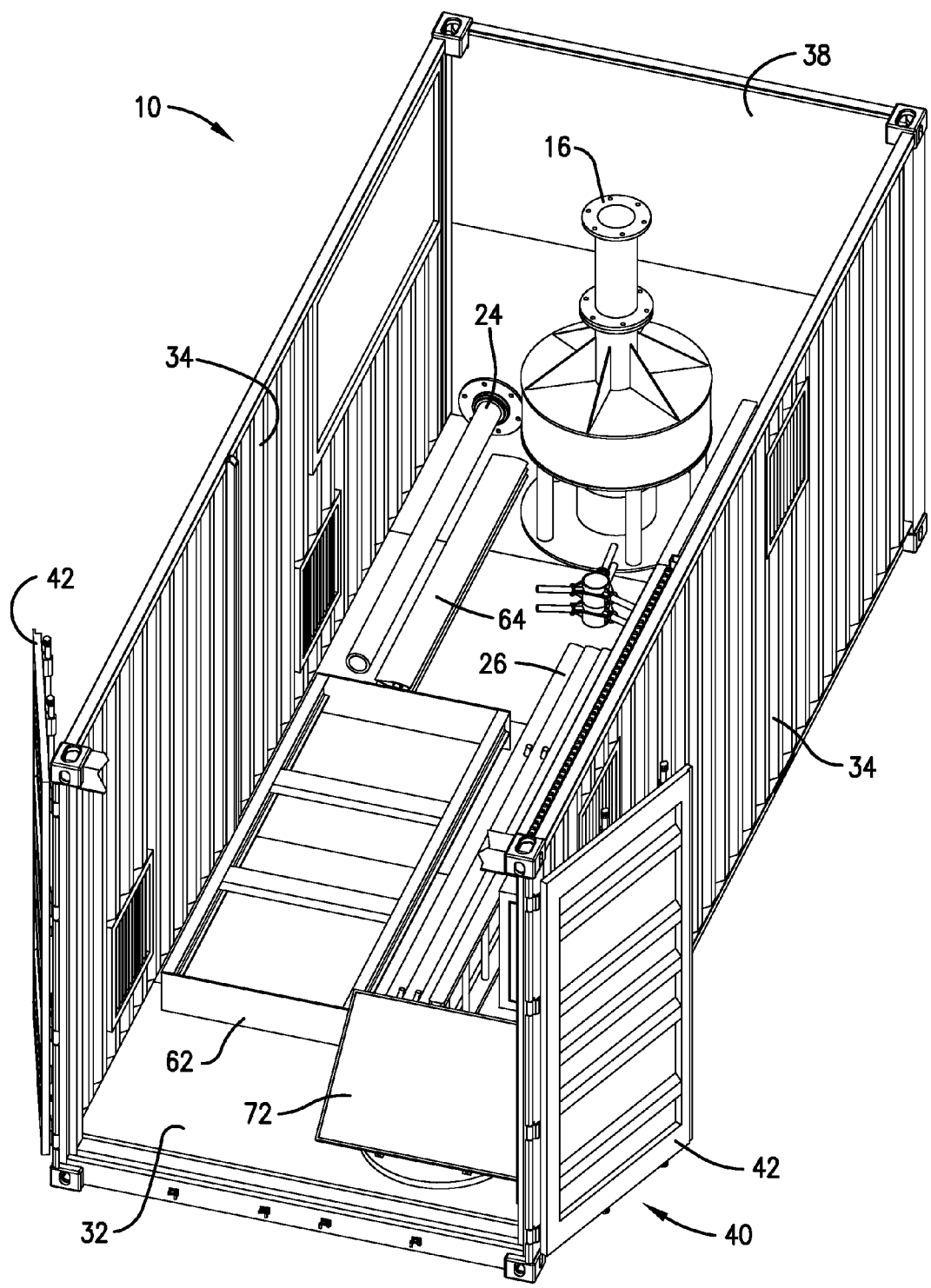
FIG. 3 is an isometric view of the EMGU from FIG. 1, particularly illustrating a container having a roof panel cutaway and a door assembly in an open position to show components of the EMGU positioned within the container.
Figure 4:
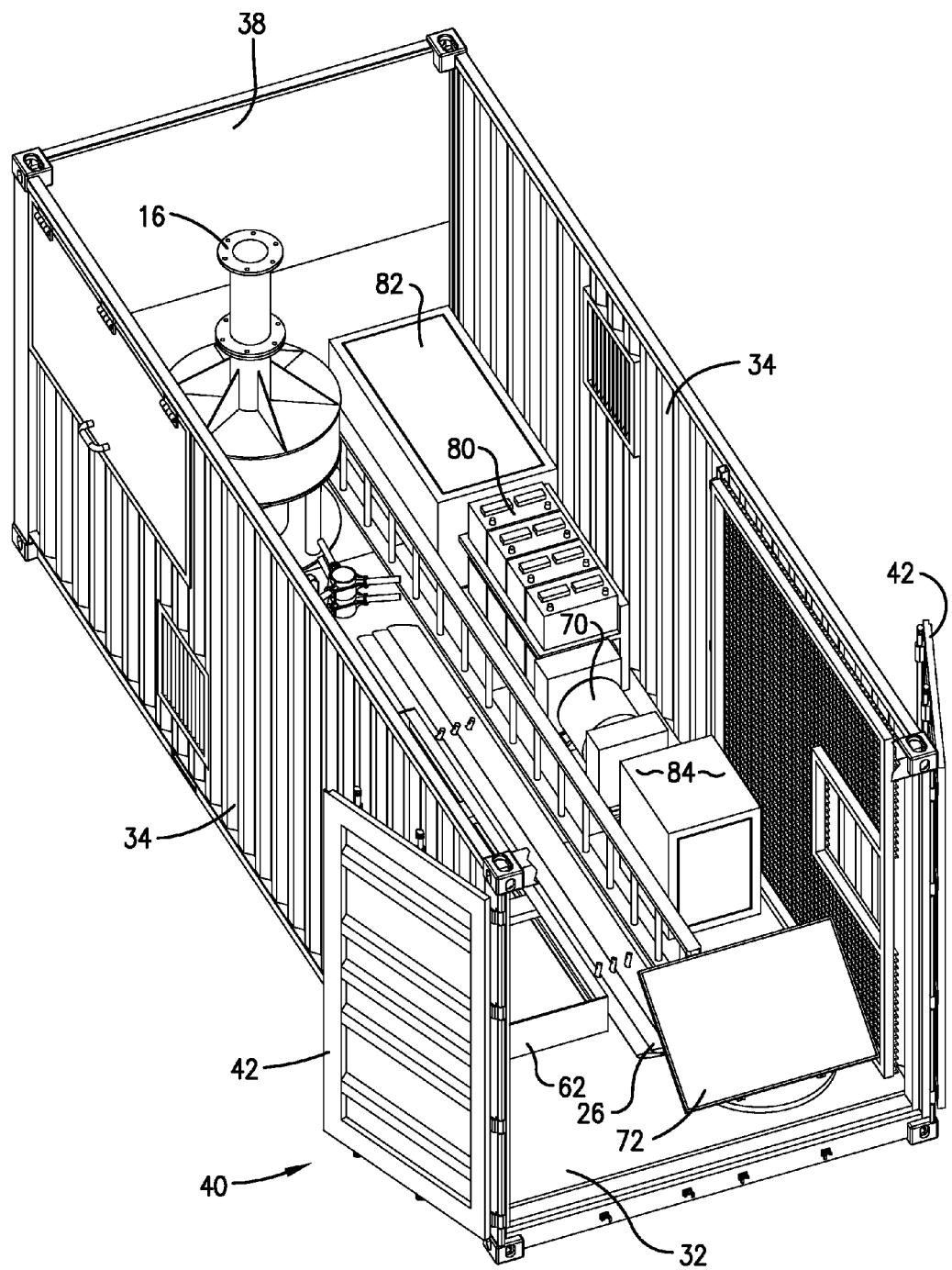
FIG. 4 is an additional isometric view of the EMGU from FIG. 3, illustrating components of the EMGU positioned within the container.
Figure 5:
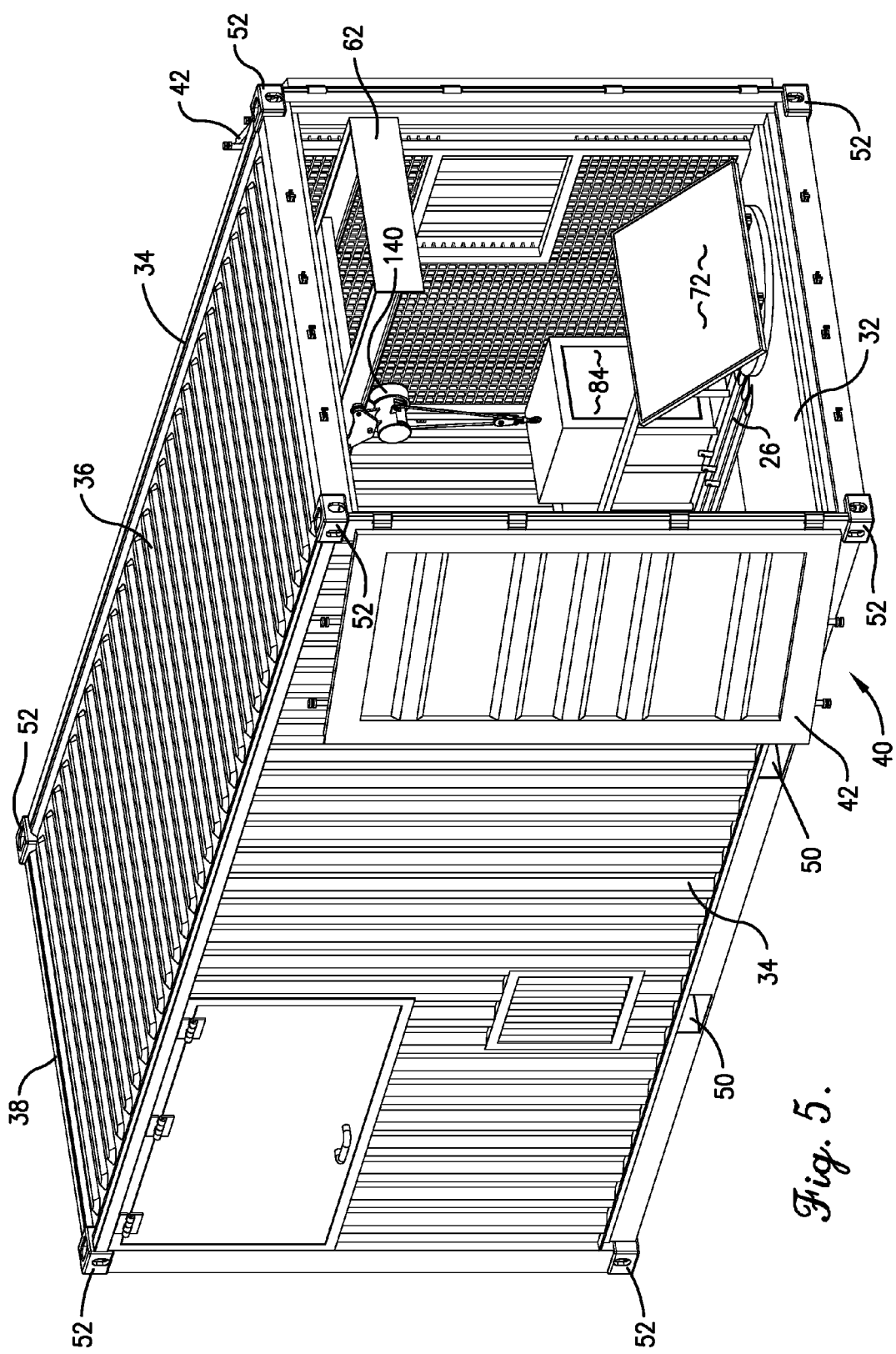
FIG. 5 is an isometric view of an EMGU having a base platform extending from a container, and with the base platform supporting a block and tackle system to assist with loading and unloading the container.

In still further detail, and with reference to FIGS. 3-5, the container 12 may be in the form of a modified shipping container, with the container comprising a standard ISO container (i.e., "a marine shipping container") having a floor panel 32, two sidewall panels 34, a roof panel 36 (See FIG. 5), an endwall panel 38, and a door assembly 40. As illustrated in the drawings, the floor panel 32, the roof panel 36, and the sidewall panels 34 extend along the central section 22, while the endwall panel 38 is positioned at the first end 18 of the container 12 and the door assembly 40 is positioned at the second end 20 of the container 12. The container may also include structural frame components, such as 3 inch (7.6 cm) piping section, which frame the panels and provide structural integrity for the container 12. The container 12 can be formed from any type of corrosion resistant material, such as stainless steel, weathering steel, or the like. In some embodiments, portions of the container material may be corrugated. In certain embodiments, some interior portions of the container 12 may have flat, smooth surfaces. For instance, as illustrated in FIGS. 3-4, the interior portion of the floor panel 32 and the endwall panel 38 may have smooth surfaces, which may be used to support components of the EMGU 10 during transportation and operation. As a specific example, such smooth surfaces may be formed from marine-grade plywood positioned over the "c" channels presented by the container's 12 corrugated panels.

Any size container 12 may be utilized with EMGU 10 of the present invention. For example, the container 12 may be a standard 20 foot (6.10 meter) ISO container with measurements of 20 feet (6.10 meters) in length, 8 feet (2.44 meters) in width, and 8.5 feet (2.59 meters) in height. Nevertheless, other container 12 sizes may be used, such as 30 foot (9.14 meter) containers, 40 foot (12.2 meter) containers, or the like. As such, the container 12 may have a length of at least 20 feet (6.10 meter), at least 30 feet (9.14 meter) containers, or at least 40 feet (12.2 meter). Furthermore, in some embodiments, the container 12 may comprise a hi-cube container having a height of about 9.5 feet (2.9 meters) or about 10 feet (3.05 meters). The container 12 of embodiments of the present invention may be capable of holding at least 30,000 pounds (13,608 kg), 40,000 pounds (18,144 kg), 50,000 pounds (22,680 kg), or more of cargo.

The door assembly 40 of the container may comprise two door panels 42 each hingedly secured to the sidewall panels 34 of the container 12. As such, the door panels 42 are configured to open outwardly from the container 12. As perhaps best illustrated by FIG. 1, the door assembly 40 may additionally include a locking mechanism 44 configured to secure the door panels 42 in a closed position. The locking mechanism 44 may comprise one or more lock bar-type locks configured to secure the door panels 42 to the roof panel 36 and/or the floor panel 32 of the container 12, particularly when the EMGU 10 is in the transportation configuration.

The container 12 may include one or more pocket components that can be used to for transporting and/or supporting the container 12. For example, as illustrated in FIGS. 1 and 5, the container 12 may include one or more forklift pockets 50 comprising openings that extend laterally through, or adjacent with, the floor panel 32 of the container 12. In some other embodiments, the container 12 may include forklift pockets 50 that extend longitudinally through the floor panel 32. The forklift pockets 50 may be configured to receive the lifting-forks of a forklift-type vehicle, which may be used to raise, lower, or otherwise transport the container 12. Additionally, the container 12 may include one or more corner lift pockets 52 at one or more of its corners. The corner lift pockets 52 may include through holes, which may be configured to receive components of various types of lifting mechanisms, such as cranes, winches, or the like. For instance, the corner lift pockets 52 may allow wires, cables, ropes, chains, or other similar mechanism to be extended therethrough for support and/or for transport purposes. The corner lift pockets 52 may also be used, advantageously, for locking down the container 12 to other containers 12 stacked together during transportation by way of a metal clip designed to be inserted in adjacent corner lift pockets 52 of adjacent containers 12.

The generator assembly 16 of the wind turbine 14 is configured to generate electrical energy from the rotation of the central shaft 24 and the rotor blades 26 of the rotor assembly 17. With reference to FIG. 2, the generator assembly 16 may include one or more generators 54 and a generator housing 56. The generators 54 may comprise a single generator or a series of generators directly or indirectly attached to the central shaft 24. The generators 54 may comprise one or more magnetic components and an induction coil. As such, rotation of the central shaft 24 is operable to cause movement of the one or more magnetic components so as to induce an electrical current within the induction coil. The generator housing 56 is configured to surround, support, and protect the generators 54. In some embodiments, the generator housing 56 may be fabricated of fiberglass, steel, aluminum, polymer, or a composite thereof. In some embodiment, as illustrated in the drawings, the generator housing 56 may be formed as a tubular support frame having an upper portion 58 and a lower portion 60. As such, the generators are disposed within an inner cavity presented within the generator housing. In some alternative embodiments, the generator assembly 16 may be formed from a sufficiently strong material, such that it may not require and/or include the bottom portion 60. As such, a central portion of the generator housing 56 can be directly attached to the container 12.

As mentioned above, in the transportation configuration, the generator assembly 16, including the generator 54 and the generator housing 56 may be housed within the container 12, as illustrated in FIGS. 3-4. In the operational configuration, the generator assembly 16 may be secured to the exterior surface of the container 12, such as illustrated in FIG. 2. In more detail, the lower portion 60 of the generator housing 56 may be secured to the door assembly 40 (i.e., the second end 20) of the container 12. The generator housing 56 may be secured to the door assembly 40 by bolting the generator housing 56 to the door assembly 40. In other embodiments, the generator housing 56 may be secured to the door assembly 40 by welding, riveting, or the like.

Figure 6:
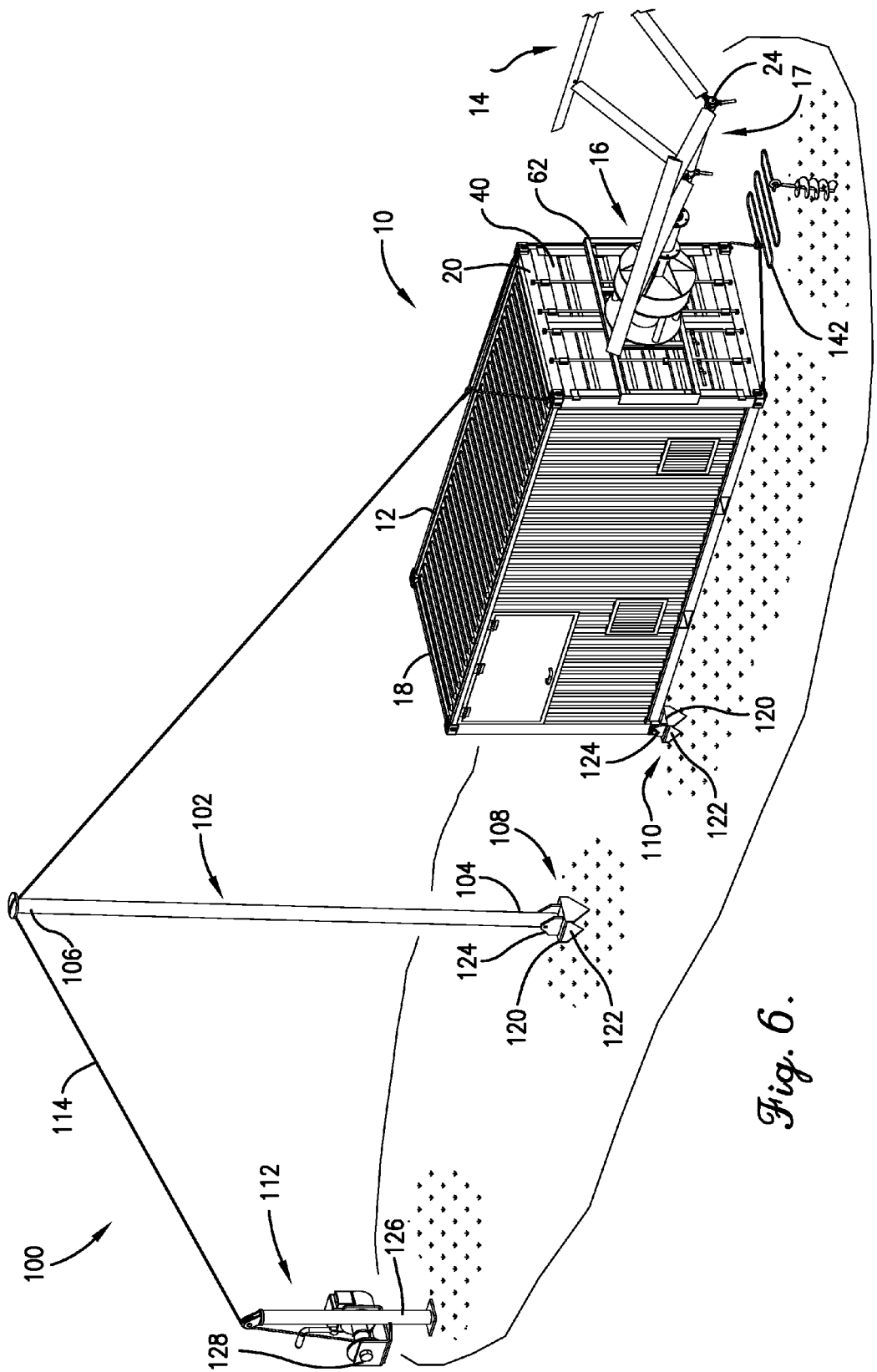
FIG. 6 is an isometric view of an EMGU transitioning from a transportation configuration to an operational configuration, showing components of a wind turbine being secured to an exterior of a container and showing a lift system for lifting the container.

In some embodiments, the generator housing 56 may be secured directly to the door assembly 40. However, in other embodiments, such as illustrated in FIG. 6, the EMGU 10 may include a base platform 62 that can be secured to the door assembly 40, such that the base platform 62 is positioned between the generator assembly 16 and the door assembly 40. As such, the base assembly 62 may provide support for the generator assembly 16, and the wind turbine 14 in its entirety, as it is secured to the door assembly 40. In particular, the base platform 62 may be configured to transfer loads from the wind turbine 14 directly to the container's 12 structural frame components. In some embodiments, as is perhaps best illustrated in FIG. 3, the base platform 62 may comprise one or more I-beams sections formed from a high-strength metal, such as iron, steel, or the like. In some embodiments, the base platform may be finned in an "H" shape, having two longitudinal sections connected by two or more lateral sections. In some other embodiments, such as illustrated in the figures the ends of the lateral sections may be connected by lateral sections as well. The sections of the base platform 62 may be connected together via weld, nut and bolt fasteners, rivets, or the like. In other embodiments, the base platform 62 may be formed as a unitary piece of material. As noted above, the base platform 62 may be secured to the door assembly 40 for providing additional support for the wind turbine 14, including the generator assembly 16 and the rotor assembly 17. The base platform 62 may be secured to the door assembly 40 by welding, nut and bolt-type fasteners, riveting or the like. Portions of the base platform 62, such as ends of the longitudinal sections may be secured to the structural frame components of the container 12 so as to further enhance stability and transfer wind turbine 14 loads down through the container 12 and to the supporting ground surface and/or foundation on which the container 12 is supported.

In certain embodiments, the EMGU 10 may additionally include a mounting platform (not shown), such as a metal plate formed from iron or steel, which may be used to enhance the ability of the base platform 62, and thus the wind turbine 14, to be secured to the container 12. With the door panels 42 of the door assembly 40 in the closed position, the mounting platform may be secured transversely across an interior portion of the door panels 42. The mounting platform may be secured via welding, nut and bolt-type fasteners, riveting, or the like. In certain embodiments, the mounting platform may be secured to the structural frame components of the container 12. The generator assembly 16 can, thus, be secured to the door assembly 40 using nut and bolt-type fasteners that extend through the base platform 62, through the door assembly 40, and into the mounting platform. In such instances, the mounting platform may include fastener openings that align with fastener openings on the door assembly 40 and/or on the base platform 62, and that align with the fasteners for the generator assembly 16. As such, the mounting platform assists in keeping the door assembly 40 in the closed position when the EMGU 10 is in the operational configuration and also provides support for the wind turbine 14 to be secured to the container 12.

Returning to FIG. 2, the rotor assembly 17 of the wind turbine 14 broadly includes the central shaft 24, one or more of the rotor blades 26, and a plurality of struts 64 connecting the rotor blades 26 with the central shaft 24. The central shaft 24 is an elongated member that extends vertically along a central axis of the rotor assembly 17 and transmits torque from rotor blades 26, via the struts 64, to the generator 54. The central shaft 24 may be fabricated from steel, aluminum, fiberglass, polymer, a composite thereof, or the like. Embodiments may provide for the central shaft 24 to have a length of between 3 to 20 feet (0.9 to 6.1 meters), 5 to 25 feet (1.5 to 5.8 meters), 10 to 18 feet (3.0 to 5.5 meters), or about 17 feet (5.2 meters). In some embodiments, the rotor assembly 17 may also include a brake system (not shown), such as a pneumatic brake system, configured to slow down or stop the central shaft 24 from rotating.

As shown in FIG. 2, the struts 64 may be thin, elongated members and configured to extend radially from the central shaft 24 outward to the rotor blades 26 for supporting the rotor blades 26 and for transmitting torque to the central shaft 24 and to the generator 54. The struts 64 may be elongated rods, I-beams, foils shaped like symmetrical or asymmetrical airplane wings as seen in the NACA library of blade profiles, or other similar structures capable of radially supporting the rotor blades 26. Various embodiments may include any number of struts 64 and, in some embodiments, one, two, or three struts 64 are used to attach a single rotor blade 26 to the central shaft 24. In other embodiments, a single strut 64 may attach one, two, or three rotor blades 26 to the central shaft 24. In still other embodiments, the struts 64 may not be used, and the rotor blades 26 may be secured directly to the central shaft 24. The struts 64 may include an inner fastening element and an outer fastening element. The inner fastening element may be operable to removably attach the strut 64 to the central shaft 24, and the outer fastening element may be operable to removably attach the strut 64 to the rotor blade 26.

The rotor blades 26 are elongated airfoils configured to create torque from movement of surrounding air and for providing the torque to the central shaft 24 through the struts 64. The rotor blades 26 may be fabricated from molded polymer or molded fiberglass, carbon fiber, or aluminum. In some embodiments, each rotor blade 26 may comprise an outer skin or shell with a reinforcing material, such as polystyrene foam, wood, dense glass composite, fiberglass, carbon fiber, aluminum, or the like, contained therein.

As with the generator assembly 16, the components of the rotor assembly 17 may be maintained within the container 12 when the EMGU 10 is in the transportation configuration, such as illustrated in FIGS. 3-4. In some embodiments, portions of the rotor assembly 17 may be supported and/or secured within the interior of the container 12 via support components, such as racks, shelves, tie-downs, ratchet straps, or the like. For example, the struts 64 and the rotor blades 26 may be supported inside the container 12 on the sidewall panels 34 via racks or shelves. The central shaft 24 may be positioned within the container 12 by resting it on the floor panel 32 and securing it in place via tie-downs. In the operational configuration, such as illustrated in FIG. 2, the rotor assembly 16 components are removed from the container 12 and secured to the exterior of the container 12. In particular, with the generator housing 56 secured to the door assembly 40, the central shaft's 24 lower portion 30 can be secured to the upper portion 58 of the generator housing 56. Next, the rotor blades 26 can be connected to the central shaft 24 via the struts 64.

Figure 11:
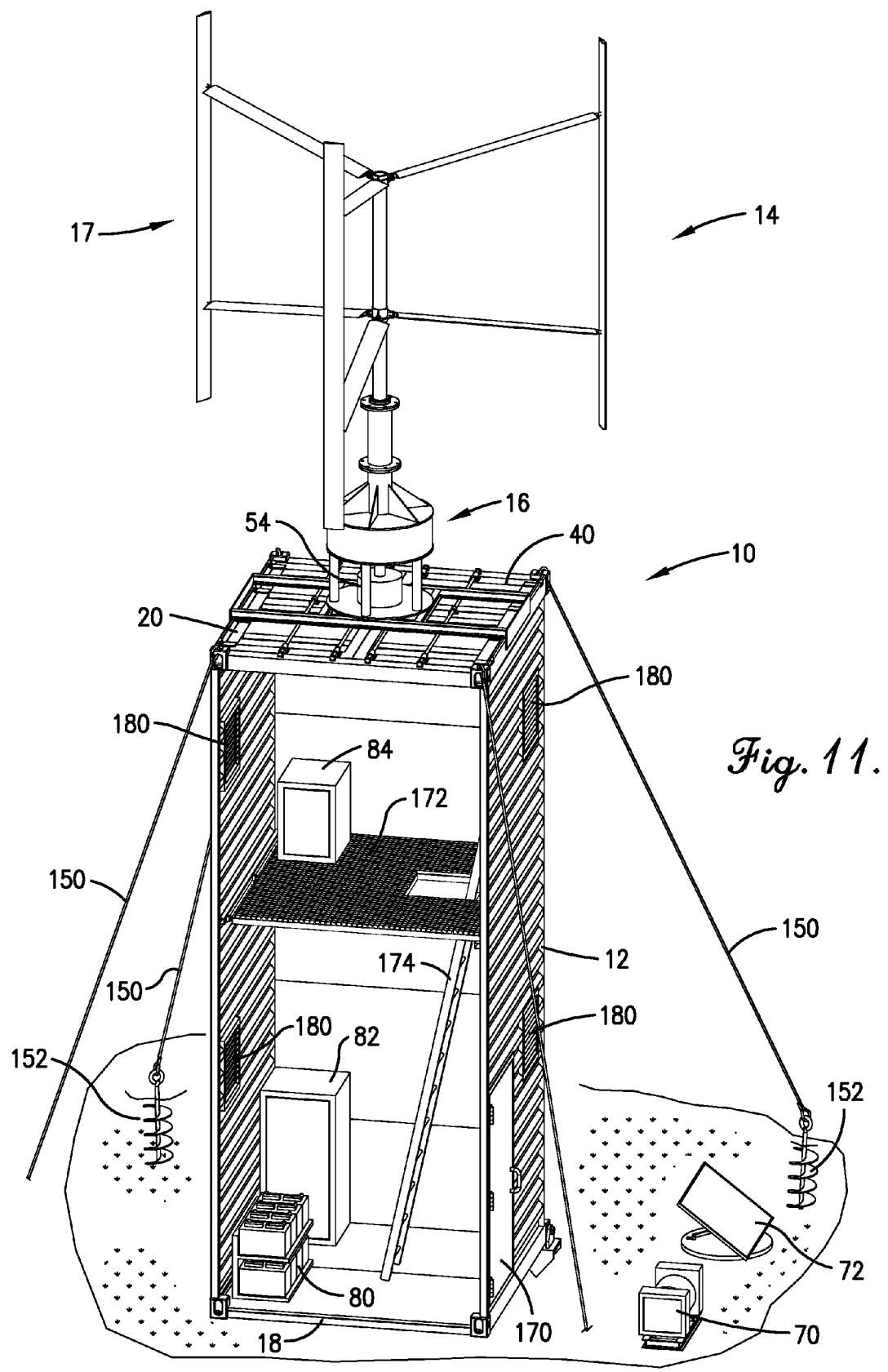
FIG. 11 is an isometric view of an EMGU in the operational configuration, with a roof panel of a container being cutaway to illustrate components of the EMGU within the container.
Figure 12:
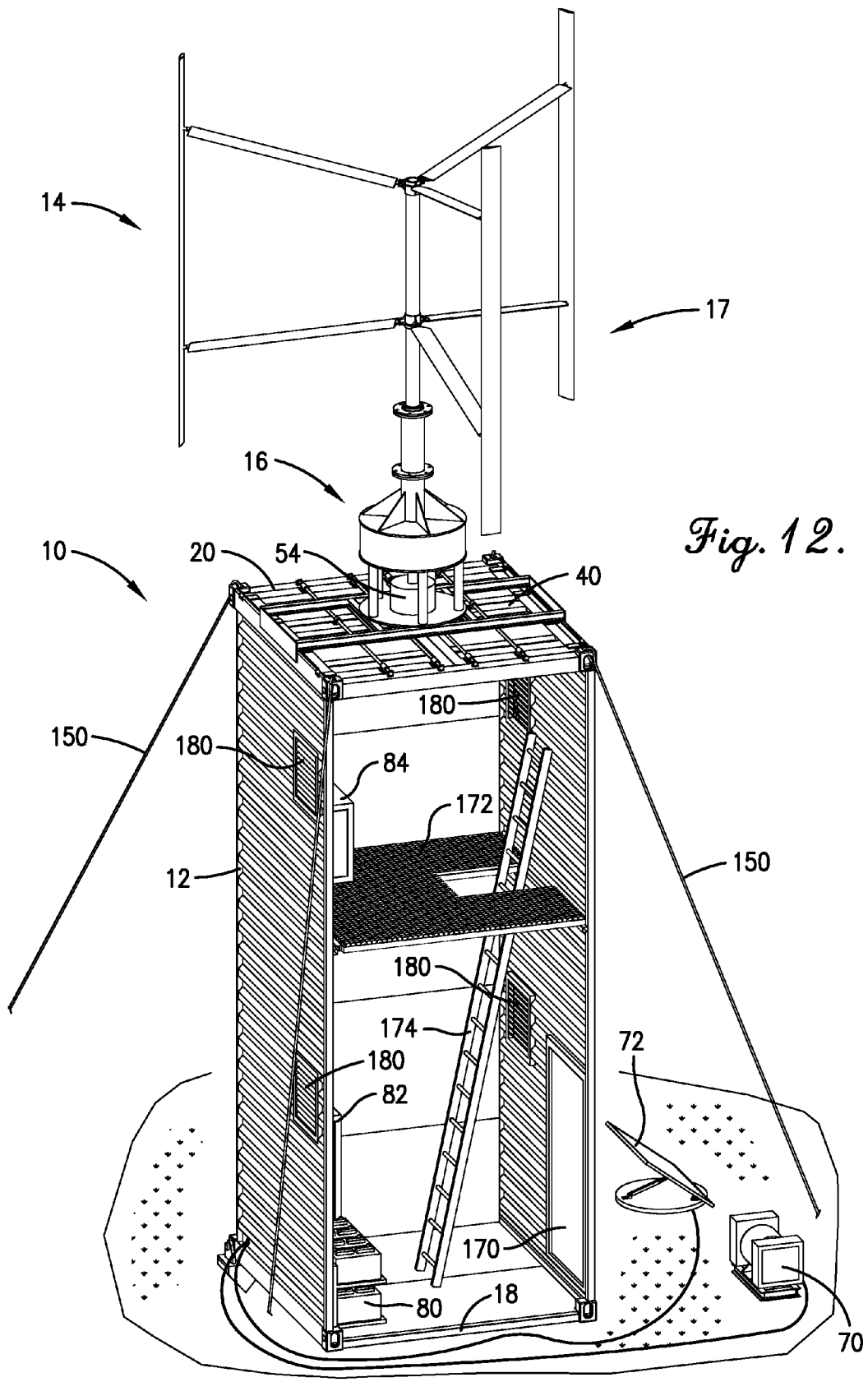
FIG. 12 is an additional isometric view of the EMGU from FIG. 11, still in the operational configuration, with the roof panel of the container being cutaway to illustrate components of the EMGU within the container.

In addition to the wind turbine 14, the EMGU 10 may include other types of energy generation systems for generating electrical energy. In some embodiments, these other energy generation systems may provide an "in-fill" role for when the wind turbine 14 is not capable of providing sufficient electrical power to the load(s) of the EMGU 10. For instance, the EMGU 10 may include a combustion generator 70 capable of generating electrical energy via the combustion of fossils fuels. In particular, the combustion generator 70 may comprise a diesel generator having a waterproof design. The selected diesel generator may be chosen based on specific power requirements, but may, in certain embodiments, have a power output of 2 kW, 5 kW, 10 kW, 15 kW, or more. In addition, the EMGU 10 may also include one or more solar panels 72 configured to generate electrical energy via the collection of solar radiation. In some embodiments, a plurality of the solar panels 72 may be electrically connected to form an array of solar panels 72. In certain embodiments, each of the solar panels 72 may be rated to output 7 volts DC, 10 volts DC, 15 volts DC, 20 volts DC, or more of electrical potential. In some embodiments, the solar panels 72 may be broadly rated to output between 17 to 50 volts DC, which may be a typical solar panel output. In the transportation configuration, as illustrated in FIGS. 3-4, the combustion generator 70 and the solar panels 72 may be housed within the container 12. In the operational configuration, as illustrated in FIGS. 11-12, the combustion generator 70 and the solar panels 72 may be positioned and/or setup outside of the container 12 so as to operate and to generate electrical energy.

Embodiments of the present invention also provide for the EMGU 10 to be equipped with an electronic control system for collecting, storing, transmitting, and monitoring the electrical energy obtained from the energy generation systems, such as the wind turbine 14, the combustion generator 70, and the solar panels 72. In various embodiments, one or more components of the electronic control system may be housed within the container, in both the transportation and operational configuration, so as to protect the components from outside weather conditions, such as the temperature, wind, precipitation, or the like. With reference to FIG. 4, the electronic control system may include an energy storage subsystem 80, a power management subsystem 82, and a communications subsystem 84. Each subsystem 80, 82, 84 may function independently or they may be integrated together, such that one subsystem may utilize components, signals, or data from the other subsystems.

The energy storage subsystem 80 may comprise a plurality of devices capable of storing electrical energy, such as electrical batteries, capacitors, super-capacitors, or the like. For example, in certain specific embodiments, the energy storage subsystem 80 may comprise between 12 and 96, between 24 and 72, or about 48 interconnected 12 volt batteries. In some embodiments, the batteries may be conventional lead-acid batteries. In alternative embodiments, the batteries may comprise hi-density, lithium membrane batteries, which have deep discharge cycles and extended battery life cycles. Such lithium membrane batteries may also be preferable because they are lighter than conventional lead-acid batteries. The lithium membrane batteries may be selected to include voltages up to 600 volts, up to 720 volts, up to 840 volts, or up to 960 volts, so as to obviate the need for multiple voltage step-downs when electrical energy is obtained by high voltage-based energy generation systems and is transmitted to the relatively lower voltage-based energy storage subsystem 80. Such voltage capabilities of the energy storage subsystem 80 may also provide for 3-phase 480 volt 60 cycles or 380 volt 50 cycle A.C. outputs when fed through the power management subsystem 82, as will be described in more detail below.

The power management 82 subsystem is configured to receive and filter the electrical energy from the energy generation systems, such as the wind turbine 14, the combustion generator 70, and/or the solar panels 72. The power management subsystem 82 is also configured to transmit electrical energy to a load, such as for example the power grid, housing units, machinery, or the like. As will be discussed in more detail below, the power management subsystem 82 broadly includes a control module, one or more rectifiers for converting the AC power obtained from AC energy generation systems to a DC power, a charge controller for controlling/conditioning the electrical energy received from the energy generation systems and being provided to the energy storage subsystem 80, an electrical bus for connecting each of the energy generation systems with the energy storage and power management subsystems 80, 82, and an inverter for converting the DC power stored in the energy storage subsystem 80 and/or for converting the power directly from the energy generation systems to an AC power for distribution to the load.

In one or more embodiments, the components of the power management subsystem 82 are all incorporated within a single housing unit, such as a module or a cabinet, within the container 12. In other embodiments, the components can be physically separated and connected electronically, such as via electrical conduits, wires, cables, or the like. The control module may be used to control each of the other components of the power management system 82. The control module may be automated or manually operated and may comprise one or more electronic processors (e.g., processors, microprocessors, microcontrollers, etc.) and associated memory elements. As such, the control module may perform various functions, such as determining when the energy generation systems should begin generating and transmitting energy, determining when the energy storage subsystem 80 should deliver electrical energy to the load, or the like. In some embodiments, the control module may utilize data from other subsystems, such as the energy storage subsystem 80, so as to determine when to begin energy generation when certain predefined criteria are satisfied. For instance, if the energy storage subsystem 80 indicates that its stored energy level has dropped below a predefined minimum level, the control module may detect such and instruct one or more of the energy generation systems to be activated so as to deliver electrical energy to the energy storage subsystem 80.

Figure 7:
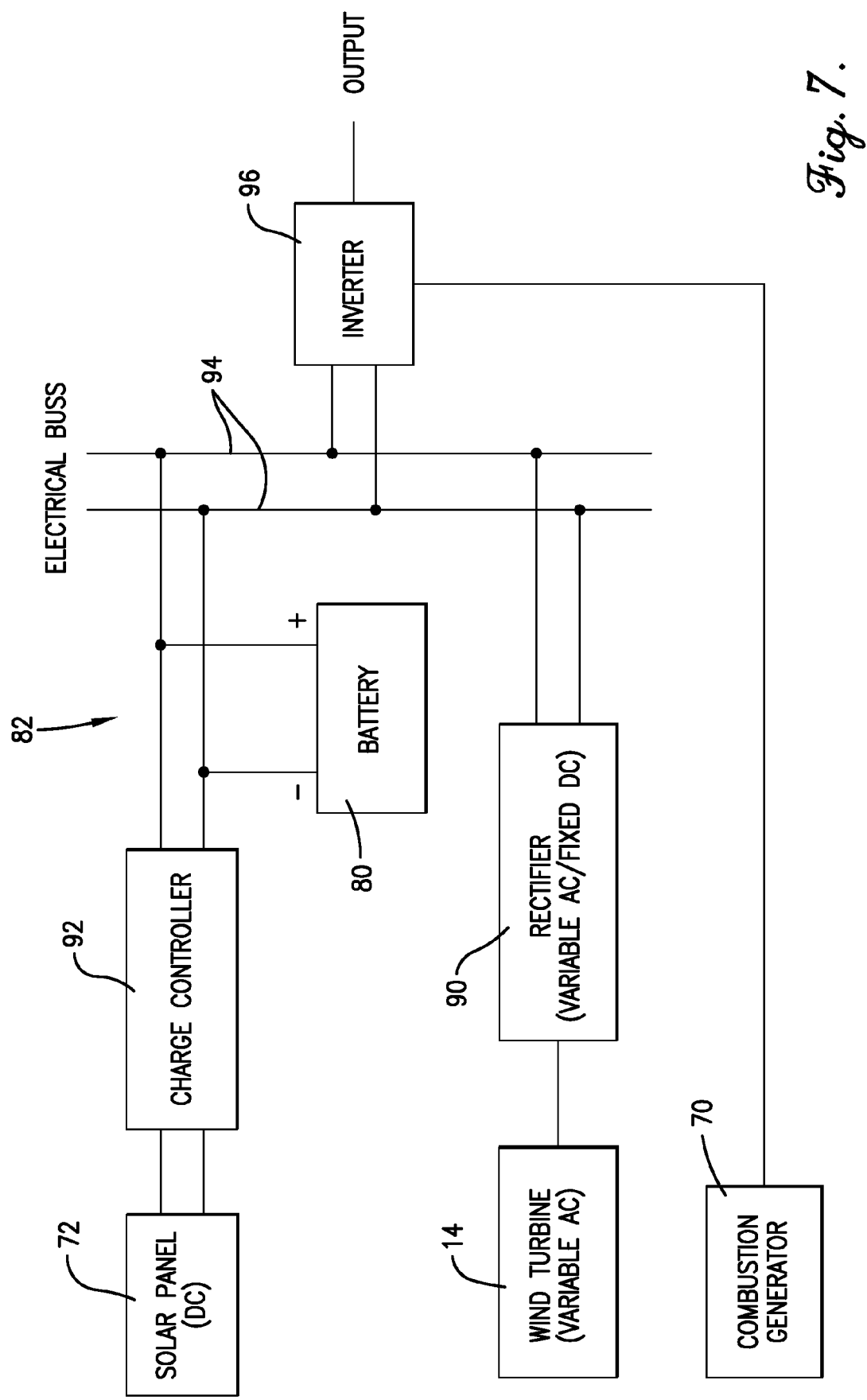
FIG. 7 is a block diagram illustrating energy generation systems and electronic control system of embodiments of the present invention.

With reference to FIG. 7, the power management system 82 may include one or more rectifiers 90, charge controllers 92, and electrical busses 94. The power management system 82 may comprise one or more rectifiers 90 for each of the energy generation systems that generate electrical energy in an unregulated AC voltage form, such as the wind turbine 14 and/or the combustion generator 70. The rectifiers 90 are configured to convert the AC waveform into a stable DC waveform suitable for storage in the energy storage subsystem 80 (e.g., the battery or batteries) or for being modulated and inverted for direct transmission to a load (i.e., via the output illustrated in FIG. 7). In some embodiments, the rectifiers 90 may also include one or more filters for assisting in providing a stabilized DC waveform. Similarly, the power management system 82 may include charge controllers 92 for each of the energy generation systems that generate electrical energy in a DC form, such as the solar panels 72. The charge controllers 92 are configured to condition the DC waveform to a level suitable for storage in the energy storage subsystem 80 or for merging and stepping-up DC voltages to match the voltage of the electrical buss 94. The electrical buss 94 may comprise a connection module configured to receive the electrical energy from each of the energy generation systems and feed such energy into the energy storage subsystem 80 for storage or direct transmission to a load. The electrical buss 94 may be used to combine the output of the various energy sources of the EMGU 10 into a common voltage, maximizing system's efficiency, and reducing initial cost. The electrical buss 94 may, in some embodiments, comprise a 600 volt DC buss; however, the specific capabilities of the electrical buss 94 may be selected as necessary for certain needs and uses. In some embodiments, the electrical buss 94 will be internally located within the inverter 96.

In one alternative, once electrical energy has been generated and stored in the energy storage subsystem 80, the electrical energy can be provided to one or more loads. In some embodiments, a load may comprise the electrical grid, which uses AC waveforms. As such, the power management system 82 may further comprise the inverter 96 for converting the DC waveform provided by the energy storage subsystem 80 to an AC waveform capable of being transmitted through the energy grid. The AC waveform may comprise standard 120 VAC, 240 VAC, 480 volt VAC, or the like. In certain embodiments, the inverter 96 may be capable of converting the DC waveform into a 3-phase AC waveform, such as 480 volts 3-phase AC. In certain other embodiments, the power management system 82 may comprise an inverter 96 in the form of one or more "motor module(s)" that are configured to connect one or more of the energy generation systems, e.g., the combustion generator 70, such that their combined inverted voltage can bypass the energy storage subsystem can be provided directly out to a load, such as external machinery in the form of large industrial motors requiring a high voltage 3-phase hook-up for enhanced power factors. Given the above, the EMGU 10 can operate as a constant, uninterrupted AC power source via the output provided by the energy storage subsystem 80 or directly from the energy generation systems (e.g., the wind turbine 14, the combustion generator 70, and the solar panels 72).

In certain alternative embodiments, the power management system 82 may include two or more separate inverters for outputting different voltages and/or frequencies to two or more loads. For example, a first inverter may output a 60 Hz AC waveform, such as is generally used in United States electrical grids. A second inverter may output 50 Hz AC waveform, as is generally used in European electrical. As was described above, the energy storage subsystem 80 may be connected to the two or more inverters for providing different outputs to the loads, or alternatively, the energy generation systems may provide the outputs to the loads via the inverters bypassing the energy storage subsystem 80.

The EMGU 10, as described above can be used to generate renewable energy from locations that may not have access to stable and reliable electrical power. For instance, one or more EMGU 10 units can be transported to a remote location via various modes of transportation. It should be understood that multiple EMGUs 10 can be interconnected to increase the amount of electrical power available for use. As described above, the components of the EMGU 10 are fully, self-contained within the container 12. As such, the EMGU 10 can be transported, in the transportation configuration, via semi-trailer truck, locomotive, helicopter, fixed-wing aircraft, nautical ships, or the like, or combinations thereof. Once at the intended location, the EMGU 10 can be shifted from the transportation configuration, which is suitable for transportation, to the operational configuration, in which the EMGU 10 can generate electrical energy.

To shift the EMGU 10 from the transportation configuration (e.g., FIG. 1) to the operational configuration (e.g., FIG. 2), the container 12 must be shifted (i.e., tipped) from having its longitudinal central section 22 generally parallel with ground surface to having its first end 18 positioned on the supporting ground surface and the central section 22 being generally perpendicular with the ground surface. As such, the second end 20 is set apart in an upward direction from the supporting ground surface. Embodiments of the present invention provide for several techniques shifting the container 12 when transitioning from the transportation configuration to the operational configuration. In one or more embodiments, the vehicle that transported the EMGU 10 can be used to tip the container 12, using a jib, a boom, ropes and/or cables, or combinations thereof. In such embodiments, the ropes and/or cables may be connected to the corner lift pockets 52 of the container or connected to the base platform 62 that may be connected to the door assembly 40 of the container 12. In one or more embodiments, a vehicle, such as a specialized dumpster truck, delivery truck, and/or pick-up truck with a tiltable truck bed, may be used to tilt the container 12. If available, a crane may also be used.

The container 12 may alternatively be shifted with a ram jack, by using two hydraulic, mechanical, or pneumatic jacks and the alternating placement of multiple sections of metal supports (e.g., pipe) on each jack. For instance, a first jack and a second jack may be positioned underneath the floor panel 32 of the container 12 in a small hand-dug pit, adjacent to the container's 12 second end 20. Once the jacks have been used to partially lift a portion of the container 12, the first jack may be unloaded (with the weight of the container 12 being supported by a second jack) so as to then free up the first jack for a new longer metal support section to be installed for the next lift upward. Such alternating use of the first and second jacks and support sections of increasing length can be used to tilt the container 12 from the transportation configuration to the operational configuration. As another alternative, a forklift could also be included in the EMGU 10 and could be used to shift the container 12, such as by inserting the forks of the forklift into the forklift pockets 50 and tilting the container 12. An advantage of using the forklift would be that the forklift may be used as a back-up energy storage subsystem, because over half the weight of the typical forklift unit is dedicated to deep discharge high-amperage batteries.

In addition to the above techniques for shifting the container 12, and with reference to FIG. 6, embodiments of the present invention include a lifting system 100 specifically configured for shifting the EMGU 10 from the transportation configuration to the operational configuration. The lifting system 100 broadly comprises a longitudinal support beam 102 having a first end 104 and a second end 106; a first pivot assembly 108 configured to be securely engaged with a supporting ground surface, with the first pivot assembly 108 being configured to be rotatably engaged with the first end 104 of the longitudinal support beam 102 such that the support beam 102 can pivot about the first pivot assembly 108; one or more second pivot assemblies 110 configured to be securely engaged with a supporting ground surface and rotatably engaged with an edge of the first end 18 of the container 12 such that the container 12 can pivot about the second pivot assemblies 110; a winch assembly 112 configured to be securely engaged with the supporting ground surface; and a mechanical link 114 having a first end secured to the winch assembly 112 a second end configured to be secured to the container 12. In operation, the lifting system 100 can be used to shift the EMGU 10 from the transportation configuration to the operational configuration without the need for additional tools or machinery. In addition, the components of the lifting system 100 can be maintained within the container 12 while the EMGU 10 is in the transportation configuration, such that the EMGU 10 remains fully self-contained.

In more detail, the support beam 102 may be formed from various material having sufficient strength and durability to be used to shift the container 12, such as metal, wood, composite materials, or the like. In some embodiments, the support beam 102 may comprise section of steel piping. In some embodiments, the support beam 102 will be at least 1.5, at least 2, or at least 2.5 times the height of the container 12. For instance, the support beam may be at least 12 feet (3.7 meters), at least 16 feet (4.9 meters), or at least 20 feet (6.1 meters) in length. The first end 104 of the support beam 102 may comprise an attachment component, such as a bracket, for rotatably securing the support beam 102 with the first pivot assembly 108. In some embodiments, such as illustrated in FIG. 6, the support component may simply comprise a through-hole for receiving components of the first pivot assembly 108. The second end 106 of the support beam 102 may include a thread plate with one or more holes thereon, through which the mechanical link 114 may be slidably received. Embodiments may provide for the mechanical link 114 to comprise rope, a wire, a cable, a chain or the like, With continued reference to FIG. 6, the first and second pivot assemblies 108, 110 may each comprise a holder plate 120, one or more ground-engaging members 122 extending from a bottom of the holder plate 120, and a hinge mechanism 124 extending from a top of the holder plate 120. The holder plate 120 may be a planar piece of material, such as a metal (e.g., steel) or a composite (e.g., carbon-fiber) plate. The ground-engaging members 122 may comprise a rod, a blade-like element, a tooth-like element, or the like, which is configured to be inserted within and retained by the ground. As such, the ground-engaging members 122 act as anchors for securing the pivot assemblies 108, 110 to the ground. The hinge mechanism 124 may comprise a pin support component configured to support a pin. For the first pivot assembly 108, the pin may be supported by the support assembly and simultaneously engaged with the first end 104 of the support beam 102, such that the support beam 102 is free to rotate about the first pivot assembly 108. Similarly, pins of the second pivot assemblies 110 may each be supported by their respective support assembly and simultaneously engaged with a corner lift pocket 52 of the container 12, such that the container 12 is operable to rotate about the second pivot assemblies 110. It is understood that multiple second pivot assemblies 110 may be used. For instance, two second pivot assemblies 110 may be used, such that one second pivot assembly 110 may be engaged with each of the corner lift pockets 52 on the first end 18 of the container 12 adjacent to the floor panel 32.

The winch assembly 112 may comprise a winch support 126 with a crank 128 secured thereto. The winch support 126 may comprise one or more support elements that are embedded or otherwise secured to the ground. In some embodiments, the winch support 126 may be partially embedded into the ground and secured therein via concrete, cement, or the like. The crank 128 may comprise an actuatable spool around which a portion of the mechanical link 114 is capable of being wound and unwound. As such, the crank 128 is capable of adjusting the tension of the mechanical link 114 so as to selectively wind or unwind the mechanical link 114 about the spool. It should be understood that as the crank 128 winds the mechanical link 114 about the spool, the mechanical link 114 is retracted, such that the second end of the mechanical link 114 is pulled towards the winch assembly 112. The crank 128 may be electrically operated, such as by an electric or combustion motor. For instance, an electric motor could be provided with electrical energy from the energy storage subsystem 80, or directly from the combustion generator 70, the solar panels 72, or forklift batteries (if available). Alternatively, the combustion generator 70 may be retrofitted to perform the mechanical work necessary for operating the crank 128. In further alternatives, as illustrated in the drawings, the crank 128 may be manually operated, such as by a rotating or reciprocating a handle. In some embodiments, the crank 128 may include a ratchet and pawl device that prevents the mechanical link 114 from unwinding from the spool unless the pawl is retracted. The crank 128 may also include one or more gears for reducing the manual effort required to wind the mechanical link 114 when it the second end of the mechanical link 114 is secured to heavy objects, such as the container 12 of the EMGU 10.

Given the above, a process for shifting the EMGU 10 from the transportation configuration to the operational configuration will now be described in detail. Once the EMGU 10 has been transported to the location at which it is intended to become operational, it will be positioned on a ground surface in the transportation configuration. Specifically, the container's 12 central section 22 will be parallel with the ground surface and the floor 32 panel will be resting on the ground surface, such as illustrated in FIG. 1. At such time the door panels 42 of the door assembly 40 can be opened and components of the EMGU 10 can be removed from inside the container. For instance, the energy generation systems may be removed from the inside of the container 12 and setup outside of the container 12. In particular, the combustion generator 70, the solar panels 72, and the wind turbine 14 components can be removed from the interior of the container 12.

To assist with removing the components from the container 12, the base platform 62 which is generally used to secure the wind turbine 14 to the door assembly 40 may also be used to assist with the removal of the components. For instance, with reference to FIG. 5, the base platform 62 can be attached to an interior portion of the roof panel 36 of the container 12, such that a portion of the base platform 62 extends outward through the doorway presented by the open door panels 42. The base panel may be secured to the roof panel 36 by nut and bolt fasteners, welding, riveting, or other available methods of attachment. As such, the base platform 62 can serve as raised "gantry crane" support on which a block and tackle system 140 can slide along. In some embodiments, the block and tackle system 140 can be slidingly attached to one or more of the I-beam sections of the base platform 62. The block and tackle system 140 may comprise one or more pulleys and ropes and/or cables. The block and tackle system 140 may also include hooks, clamps, or other mechanisms for securing the components of the EMGU 10 that are to be removed from the container 12. In some embodiments it may be preferable to extend a length of the base platform 62, such that it can extend along an entire longitudinal length of the interior of the container 12 and/or such that it can extend a significant distance out of the doorway. In such instances, embodiments provide for a section of material from which the base platform 62 is formed (e.g., I-beam material) to be spliced with the base platform 62. As such, the modified base platform is configured to allow the wind turbine 14, the combustion generator 70, the solar panels 72, and any other components (e.g., batteries) to be efficiently removed from the interior of the container 12.

Once the components of the EMGU 10 that are required to be removed from the container 12 have been removed, the wind turbine 14 can be assembled and secured to the second end 20 of the container 12, with such second end 20 including the door assembly 40. To accomplish such, and with reference to FIGS. 6 and 8, the door panels 42 of the door assembly 40 are shut and locked in place via the locking mechanism 44. To secure the wind turbine to the second end 20 of the container 12, the generator assembly 16 is secured to the door assembly 40, as previously described. In embodiments that include the base platform 62, the base platform 62 may be secured between the door assembly 40 and the generator assembly 16. Similarly, in embodiments that include the mounting platform, the mounting platform may be secured to the interior of the door assembly 40, as previously described.

Figure 8:
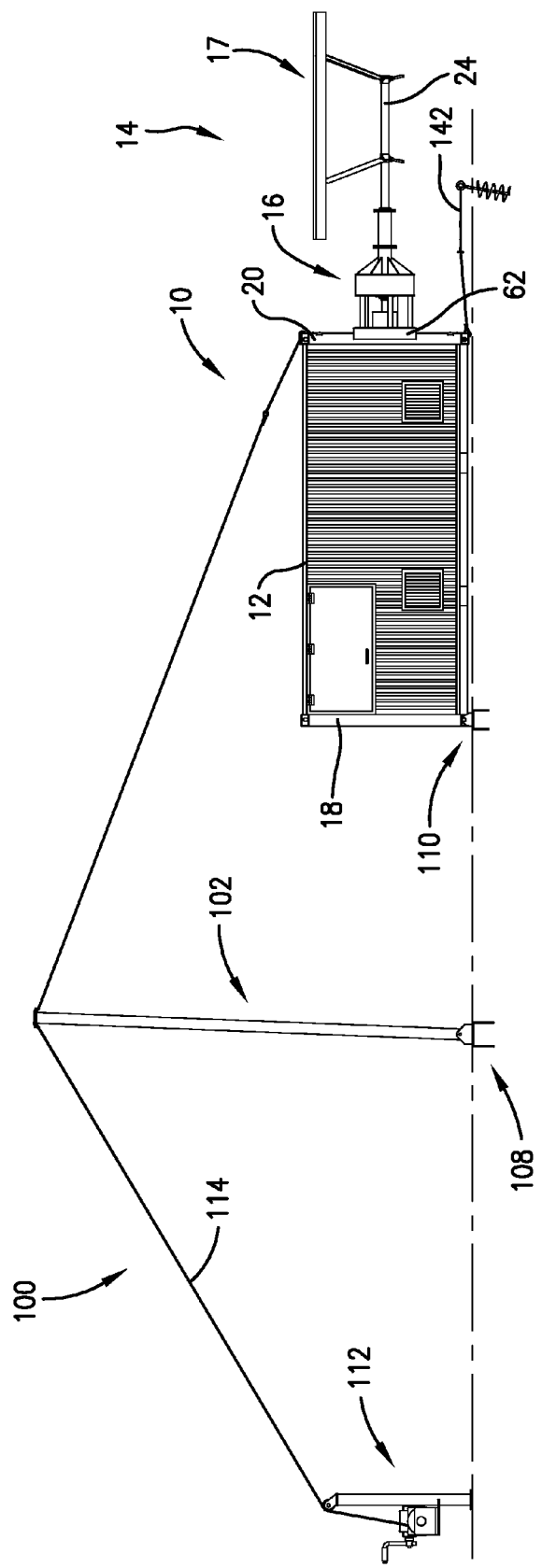
FIG. 8 is an elevational view of the EMGU from FIG. 6.

Once the generator assembly 16 is attached, the central shaft 24 of the wind turbine 14 can then be secured to the generator assembly 16. Thereafter, one or more of the rotor blades 26 and/or the struts 64 can be secured to the central shaft 24. In some embodiments, such as illustrated in FIGS. 6 and 8, not all of the rotor blades 26 and/or struts 64 will be able to be secured to the central shaft 24 when the container 12 is positioned with its central section 22 on the ground because the central shaft 24 is positioned too close to the ground. For instance, when the wind turbine 14 includes three rotor blades 26, two of the rotor blades 26 and their corresponding struts 64 may be secured to the central shaft 24, with such blades 26 being positioned generally 120 degrees apart. However, the remaining rotor blade 26 and corresponding struts 64 may not be able to be secured to the central shaft 24 because the ground will interfere with such attachment. As such, the container 12 must be at least partially shifted (i.e., tilted) upward.

To accomplish the upward tilting, the lifting system 100 may be used. In more detail, with continued reference to FIGS. 6 and 8, the winch assembly 112 is secured to the ground a distance away from the first end 18 of the container 12. The winch assembly 112 can be secured to the ground by embedding at least a portion of the winch assembly's 112 winch support 126 within the ground. The support beam 102 is similarly secured to the ground between the winch assembly 112 and the first end 18 of the container 12. As was previously described, the first end 104 of the support beam 102 is secured to the ground via the first pivot assembly 108. The first pivot assembly 108 is secured to the ground by embedding the ground-engaging members 122 into the ground, such that the holder plate 120 is generally parallel with the ground surface. In some embodiments, the holder plate 120 will be positioned adjacent to the ground surface. In other embodiments, a portion of the ground in which the first pivot assembly 108 is positioned will be removed, such as by 3 or more inches, such that the holder plate 120 will be positioned below the surface of the ground (i.e., below the ground surface). As such, the first end 104 of the support beam 102 is secured to the hinge mechanism 124 of the first pivot assembly 108. Similarly, the first end 18 of the container 12 will be connected to the one or more second pivot assemblies 110. In particular, certain embodiments may provide for two second pivot assemblies 110. The second pivot assemblies 110 may each be secured to the ground by embedding its ground-engaging members 122 into the ground, such that the holder plate 120 is generally parallel with the ground surface. In some embodiments, the holder plate 120 will be positioned adjacent to the ground. In other embodiments, a portion of the ground in which the second pivot assembly 110 is positioned will be removed, such as by 3 or more inches, such that the holder plate 120 will be positioned below the surface of the ground (i.e., below the ground surface). As such, the first end 18 of the container can be secured to the hinge mechanisms 124 of the second pivot assemblies 110. In particular, one of the second pivot assemblies 110 can be secured to each of the corner lift pockets 52 on the container's 12 first end 18, on either side of the floor panel 32. It should be understood that positioning the holder plate 120 below the ground may be beneficial for the second pivot assemblies 110 because the first end 18 of the container 12 can be secured to the second pivot assemblies 110 while the container 12 is resting on the ground surface (i.e., the container 12 does not need to be raised above the ground to be connected to the second pivot assemblies 110).

In such a configuration, as shown in FIGS. 6 and 8, the mechanical link 114 (e.g., rope or wire cable) can be extended from the crank 128 of the winch assembly 112, through the thread plate on the second end 106 of the support beam 102, and finally connected to the corner lift pockets 52 of the second end 20 of the container 12. In particular, the mechanical link 114 may be connected to the corner lift pockets 52 on the roof panel 36 of the container 12, on the container's 12 second end 18. As illustrated in FIGS. 6 and 8, the support beam 102 should be angled generally perpendicular with the ground surface such that the mechanical link 114 extends at a downward angle from the second end 106 of the support beam 102 to the corner lift pockets 52 on the second end 20 of the container 12. Thereafter, the crank 128 can be actuated to create a tension in the mechanical link 114 (e.g., by winding the mechanical link 114), such that the container 12 is shifted and/or tilted upward. In particular, the second end 20 of the container 12 is lifted upward, while the container 12 pivots about the portion of the first end 18 that is connected to the second pivot assemblies 110.

Figure 9:
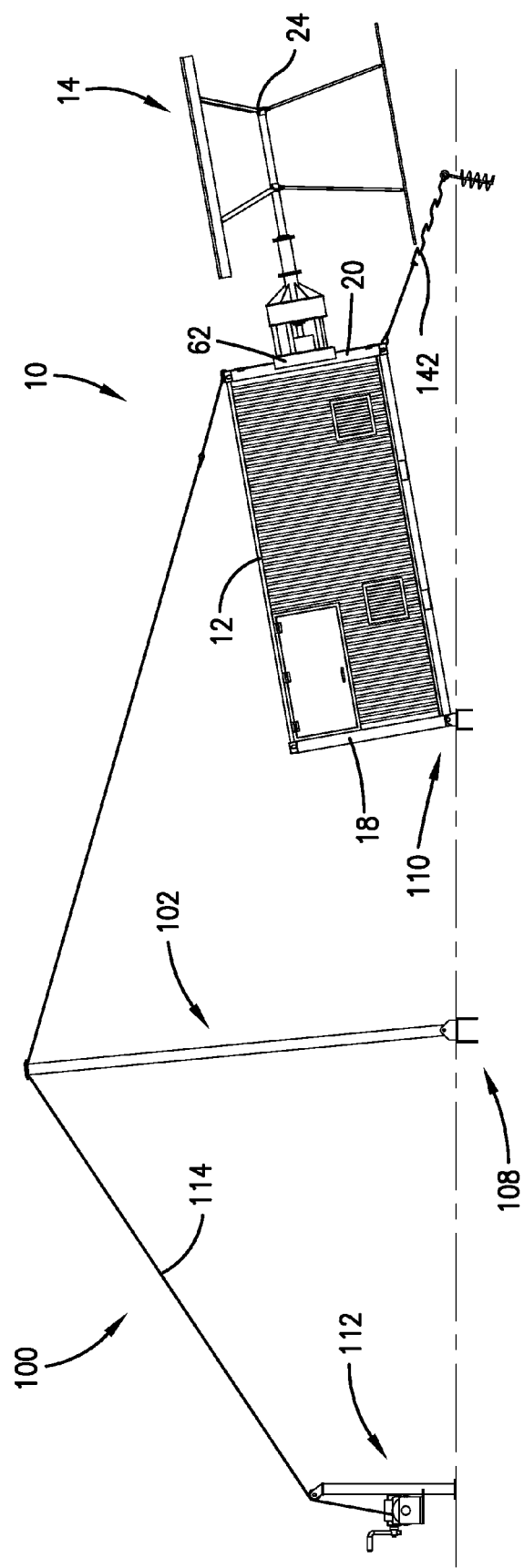
FIG. 9 is an elevational view of the EMGU from FIGS. 6 and 8 being transitioned from the transportation configuration to the operational configuration via the lift system, and with a complete wind turbine installed on the exterior of the container.
Figure 10:
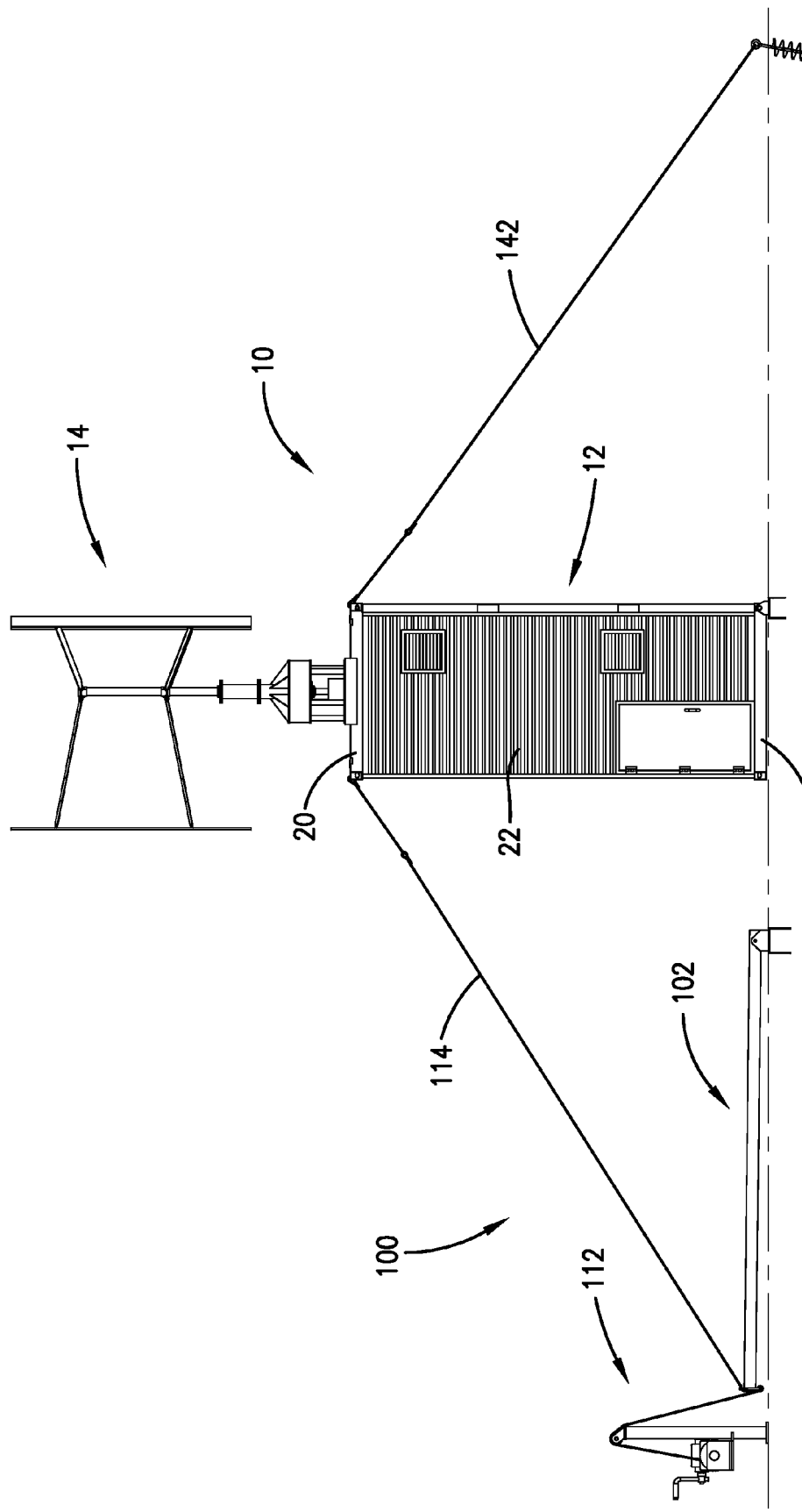
FIG. 10 is an elevational view of the EMGU from FIGS. 6 and 8-9 being transitioned from the transportation configuration to the operational configuration via the lift system, with a central section of the container being generally perpendicular with a ground surface.

To complete attaching the components of the wind turbine 14, the second end 20 of the container should be lifted to an intermediate position between 2 to 16 feet (0.6 to 4.9 meters), between 4 to 10 feet (1.2 to 3.0 meters), or between 6 to 8 feet (1.8 to 2.4 meters) from the ground surface. At the intermediate position, such as illustrated in FIG. 9, the central shaft 24 of the wind turbine 14 is lifted sufficiently from the ground to provide enough clearance for attaching the third rotor blade 26 and associated struts 64. With the wind turbine 14 completely assembled, the container 12 can be lifted, via the lifting system 100, from the intermediate position to the operational configuration (See, e.g., FIG. 10) in which the container 12 is completely upright with the central section 22 generally perpendicular with the ground surface. In some embodiments, the lifting system 100 will include a trailing support 142 comprised of a wire, cable, rope, or the like, which is anchored into the ground at a first end. The trailing support's 142 second end may be secured to the lift corner pockets 52 on the container's 12 second end 20, opposite the mechanical link 114. The trailing support 142 has a length that is fully extended when the container 12 is in the operational configuration, so as to ensure that the container 12 will not be tilted too far and tip-over over during transitioning from the transportation configuration to the operational configuration.

As such, as is illustrated by FIGS. 11-12, the first 18 end of the container 12 will be positioned on the supporting ground surface and the second end 20 will be positioned upward, away from the supporting ground surface. Furthermore, the wind turbine 14 will be extending upward from the second end 20 of the container 12. Advantageously, the wind turbine 14 will be positioned at least 20 feet (6.1 meters) upward from the ground surface (i.e., the length of the container 12) where it can efficiently intersect with air/wind-flows that can cause rotation of the rotor blades 26 and a corresponding generation of electrical energy via the generator assembly 16. As such, the EMGU 10 provides for the wind turbine 14 to be ideally positioned at a distance sufficiently above the ground without the need of an extended central shaft 24 that would require additional space within the container 12 and/or that would add additional weight to the EMGU 10.

Once the container 12 of the EMGU 10 has been shifted to the operational configuration, the container 12 can be supported in such a configuration via various support mechanisms. For instance, the EMGU 10 may include one or more guy wires 150 that extend from the second end 20 of the container to the ground. In particular, a first end of a guy wire 150 may be secured within the ground, via anchors 152, while a second end of the guy wire 150 may be secured to one of the corner lift pockets 52 on the second end 20 of the container 12. The anchors 152 may comprise screw-type elements that can be mechanically driven (e.g., rotated) into the ground. In instances in which the ground comprises rock, a rock drill and epoxy grouting may be used to secure the anchors 152 into the ground. With sand, a "deadman" weight can be formed, whereby a heavy object is created by consolidating a large quantity of sand into large geotech (i.e., reinforced) bags. In snow, a heavy object can be buried under disturbed snow that will reconsolidate to a harder texture and thereby create an anchor point to serve as deadman weight. For example, tree logs lashed together can serve as an anchor 152 for the guy wires 150. In addition, the guy wires 150 may each include a turnbuckle (not shown) capable of applying tension in the guy wire 150 so as to support the container 12 in the operational configuration, even under circumstances, such as storms, that include strong winds. When deadman weights are used, openings of the geotech bags can be closed with wire closures tied with a steel ring to accept the free ends of the turnbuckles of the guywire 150.

In some embodiments, the EMGU 10 may include four guy wires 150 extending from each of the four corner lift pockets 52 of the second end 20 of the container 12. As such, the guy wires can prevent the container 12 from leaning or tipping when strong winds are present. In some embodiments, the guy wires 150 used to secure the container 12 in place may also be comprised of the same mechanical link 114 (i.e., ropes or cables) used to shift the container 12 as the EMGU 10 is transitioned from the transportation configuration to the operational configuration.

Embodiments of the present invention may also provide for the formation of a solid foundation on which the container 12 can be supported in the operational configuration. Such a foundation may be configured in a manner so that the weight from the container 12 will be distributed evenly through the first end 18 of the container 12, to the foundation, and into the supporting ground. Preferably, the foundation will provide stability for the container 12, which weighs as much as 5,000 pounds (2,268 Kg), and to support an additional 5,000 pounds (2,268 Kg) of EMGU 10 components stored within the container 12, e.g., inverter 96, energy storage subsystem 80, and/or the like. In addition, the foundation will preferably allow liquid to efficiently drain through the foundation and into the ground. Furthermore, the foundation will preferably be configured to allow the container 12 to be readily detached from the foundation should the EMGU 10 need to be shifted from the operational configuration back to the transportation configuration for removal and further transportation.

Generally, sites at which the EMGU 10 will be in operation will have ground layers comprised of (1) a layer of topsoil, (2) a layer of till, clay, or sand beneath the topsoil layer, (3) a combination layer of sedimentary rock, sand, and gravel, and (4) a layer of bearing rock that is comprised of older and weathered rock. The layers above the bearing rock will generally include organic soils, sand, stone and gravel, and the organics in the form of clays and sedimentary rock that are less stable. Such instability may be problematic for supporting the EMGU 10 as it is shifted from the transportation configuration to the operational configuration and for supporting the EMGU 10 during operation.

To provide for sufficient support of the EMGU 10, the foundation may comprise a floating foundation, such as reinforced concrete, poured on a structural matt or a layer of gravel. The floating foundation should be formed in within an area of the ground that has been excavated. In particular, ground material should be excavated in amounts that exceed the load weight that is to be added to the excavated area (e.g., foundation material, EMGU 10 components, etc.). As such, load forces (i.e., the weight and the overtopping loads generated by the container 12, the wind turbine 14, wind turbine 14 motion, windage, and the like) of the EMGU 10 can be sufficiently transferred to the surrounding ground material. Alternatively, a deep foundation may be formed by driving foundation support elements (e.g., large, reinforced anchors) down through the ground until such elements reach a bearing rock, which can provide support for the load of the foundation and/or the EMGU 10. For example, for ground types that have a layer of granite below the ground surface, foundation support elements may be driven down into the granite for supporting the foundation and the EMGU 10.

Figure 13:
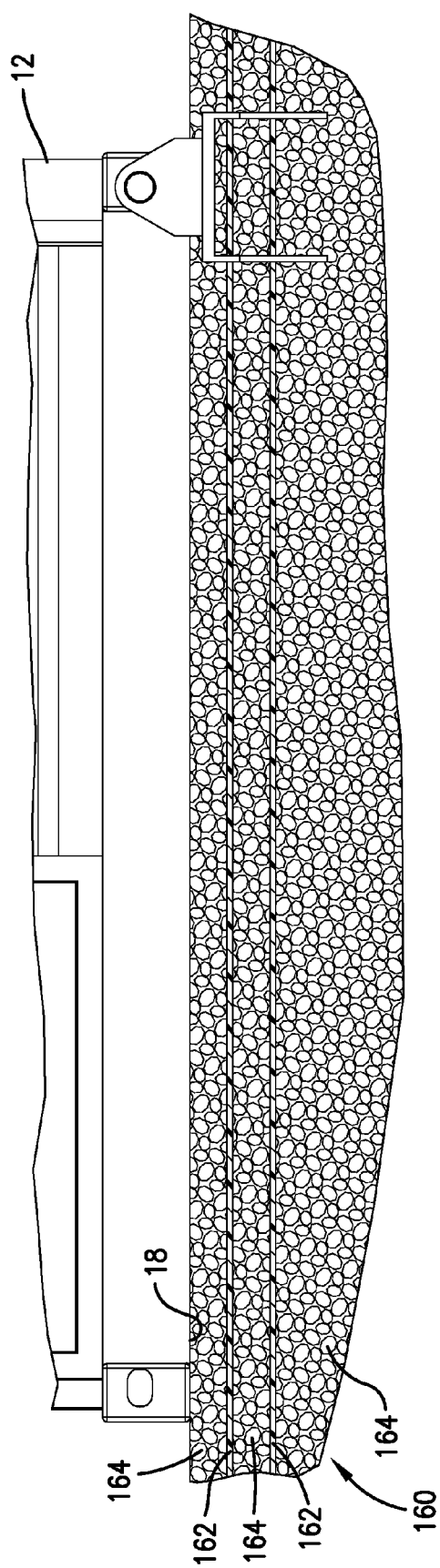
FIG. 13 is a partial elevational view of an EMGU in an operational configuration and being supported by a transportable foundation.

For certain sites of operation for the EMGU 10, the exact composition of the ground layers may be unknown. Additionally, it may be difficult to obtain the materials and the manpower necessary to create a floating foundation or a deep foundation. As such, and with reference to FIG. 13 embodiments of the present invention provide for the use of a transportable foundation 160 comprised generally of one or more mesh layers 162 disposed between a rock and/or gravel layer 164. The mesh layers 162 may be comprised of a relatively stiff, plastic material that are formed as a mesh or netting and that can be transported in a rolled form. As such, a volume of ground material may be removed such as with a simple shovel or with more complex machinery, such as a tractor, a backhoe, or the like. Thereafter a rock and/or gravel layer 164 may be disposed within the excavated ground area. Next, a mesh layer 162 may be disposed over the rock and/or gravel layer 164. Finally, an additional rock and/or gravel layer 164 may be placed on the top of the mesh layer 162. Because the mesh layer 162 is horizontally rigid, the rock and/or gravel layers 164 are not permitted to shift or slide laterally. As such, the rock and/or gravel is securely locked in place so as to provide a load bearing foundation similar to that of concrete. In some embodiments, such as shown in FIG. 13, multiple layers of alternating rock or gravel layer 164 and mesh layers 162 may be used. Beneficially, the transportable foundation 160 provides for enhanced drainage ability because liquid is permitted to flow through the rock and/or gravel layers 164 and through the mesh layers 162. It should be understood that the transportable foundation 160 will preferably be formed large enough to provide support for the EMGU 10 in the operational configuration. In particular, given that the first end 18 of the container 12 has dimensions of 68 square feet (6.24 square meters), a transportable foundation 160 should, therefore, be formed to have a surface area larger than 68 square feet (6.24 square meters). In some embodiments the transportable foundation 160 should be at least 1 to 1.5 times the surface area presented by the first end of the container 12. Additionally, because the mesh layers 162 lock in the gravel and/or rock above and below the mesh layers 162, the transportable foundation 160 may, in some embodiments, be formed directly on top of the ground surface without requiring any excavation of the ground.

For sites of operation for the EMGU 10 that have even less stable ground, a synthetic subsurface layer may be used as a bottom layer of the transportable foundation 160. Such a subsurface layer may be comprised of a geotech fabric welded on each side of a stiff plastic webbing and/or netting structure. As such, the subsurface layer will provide an internal rigidity to the foundation 160. Such a subsurface layer will have the capacity to spread the load of the container 12 over soft sand-like soils. Furthermore, the subsurface layer will further enhance drainage capabilities of the transportable foundation 160, and will also serves to keep loose, fine material from being eroded out from under the fabric of the subsurface layer and also from working its way upward through the fabric and creating dust around the EMGU 10. As with the mesh layer 162 described above with respect to the transportable foundation 160, the subsurface layer may be provided in rolls of material, such that the subsurface layer can be easily rolled-out for installation.

With the EMGU 10 in the operational configuration, such as illustrated in FIGS. 11-12, the EMGU 10 can be used to generate, store, and distribute electrical power as need to various loads. In particular, the electrical energy obtained from the wind turbine 14 can be directed through the rectifier 90 and/or the charge controller 92 of the power management subsystem 82 for storage in the energy storage subsystem 80 (e.g., the batteries). It is understood that the generator 54 of the generator assembly 16 may be connected, directly or indirectly, to the energy storage subsystem 80 via one or more electrically-conductive wires or cables that extend through the door assembly 40 and to the energy storage subsystem 80 within the interior of the container 12. Alternatively, or in addition, the electrical energy obtained from the wind turbine 14 can be directed directly to the electrical grid.

As was previously described, electrical energy may also be obtained from other energy generation systems, such as the combustion generator 70 and the solar panels 72. The combustion generator 70 may be setup outside from the container 12, such that the heat generated from the combustion generator 70 and combustion gas byproducts are not trapped within the interior of the container 12. As particularly illustrated by FIG. 12, the combustion generator 70 may be connected, directly or indirectly, with the energy storage subsystem 80 within the container via one or more electrically-conductive wires or cables. Such cables may extend through the panels of the container 12 via military specification pin and screw-type plugs. Such plugs may be located on the panels of the container 12 so as to electrically connect wires and/or cables outside of the container 12 to inside the container 12. The plugs may include a protection plate for covering the electrical connections to keep such connections protected during transport.

Similarly, the solar panels 72 may be erected and setup outside of the container 12 where they are in position to receive sunlight for conversion into electrical energy. In some embodiments, the solar panels will 72 be arranged on the ground facing towards in an appropriate southerly direction and angle in relation to the sun based on a latitudinal position of the EMGU 10. In other embodiments, the solar panels 72 may be secured to the outside of the container 12, such as by being hung from the container 12. In such instances, each of the solar panels 72 may include an attachment arm that slides up a track on a backside of the solar panel 72 or that is otherwise fastened to the solar panel 72, such that the solar panel 72 can be secured to the container 12 and can have it inclination angle set for specific intersection with solar radiation. In certain embodiments, the EMGU 10 will provide for the solar panels 72 to be hung from generally an upper half of the container 12 (i.e., from the second end 20 of the container 12 to about midway between the first and second ends 18, 20) when the EMGU 10 is in the operational configuration. Advantageously, embodiments of the present invention that include the solar panels 72 being secured to the exterior of the container 12 will provide for the solar panels 72 to act as sun shades or as an awning, so as to prevent the container 12 from overheating due to over exposure to solar radiation. Furthermore, in some embodiments, the solar panels 72 can act as supports for hanging barriers and/or netting to protect the operators of the EMGU from insects (e.g., mosquitos) or other pests. Although FIGS. 11 and 12 only illustrate a single solar panel 72, it is understood that the EMGU 10 may include a plurality of solar panels 72 setup as an array. As particularly illustrated by FIG. 12, the solar panels 72 may be connected, directly or indirectly, with the energy storage subsystem 80 within the container 12 via one or more electrically-conductive wires or cables and/or one or more pin and screw-type plugs positioned on the container 12. The electrically-conductive wires or cables that run throughout the interior of the container 12 may extend through pipes positioned along the panels of the container 12. In certain embodiments, such pipes may be the metal supports that may be used in conjunction with the previously-described jacks, which in some embodiments, may be used to shift the container 12 during the EMGU's 10 transition from the transportation configuration to the operational configuration.

In certain embodiments, the EMGU 10 may include features that allow the container 12 to be used as a work and/or living space for crew members manning the EMGU 10. For instance, with reference to FIGS. 11-12, and with the EMGU 10 in the operational configuration, the container 12 may include a personal-access door 170 configured to allow an operator to access the interior of the container 12 from a ground surface. In some embodiments, the door 170 may be positioned on one of the sidewall panels 34 comprising the central section 22 of the container 12. The door 170 may be positioned upwards, away from the ground surface so as to reduce the chance of environmental substances (e.g., rain water, wildlife, etc.) from accessing the interior of the container 12 with the door 170 in an open position. For instance, the door 170 may be spaced about 1 foot (0.3 meters), about 2 feet (0.6 meters), or about 3 feet (0.9 meters) above the ground. Once the operator has entered the interior of the container 12, the operator can access the components of the EMGU 10, such as the energy storage subsystem 80, the power management subsystem 82, and the like. In some embodiments, the EMGU 10 will include the communications subsystem 84 that allows the operator and/or the EMGU 10 to communicate electronically. Such communications subsystem 84 may include components necessary to communicate via cellular, satellite, Wi-Fi, or other similar radio frequency channels. The communications subsystem 84 may also be configured to automatically broadcast various types of monitoring data of the EMGU 10 back to a central control center or serve double purpose as a community communications hub.

In certain embodiments, the interior of the container 12 can be divided up into two or more portions. For instance, as shown in FIGS. 11-12, the EMGU 10 may include a flooring panel 172, which may be formed from a grate-type material. The flooring panel 172 may be sized so as to be capable of spanning generally an entire cross-section of the interior of the container 12 for dividing the container 12 into two sections, including a lower section and an upper section. The flooring panel 172 can be secured in place via one or more mounting tabs extending from the interior portions of the panels 32, 34, 36 of the container 12. The mounting tabs may be pre-welded to the panels 32, 34, 36 of the container 12. In some embodiments, the flooring panel 172 may be hingedly secured to one of the panels 32, 34, 36 of the container 12, such that the floor panel 172 is configured to rotate from a position at which the flooring panel 172 is generally adjacent to one of the panels 32, 34, 36 (e.g., as shown in FIG. 4) to a position where the floor panel divides the interior of the container 12 into the lower section and the upper section (e.g., as shown in FIGS. 11-12). The flooring panel 172 may include an opening for allowing the operator to pass from the lower section to the upper section. Additionally, the EMGU 10 may include a ladder 174 for allowing the operator to access the opening in the floor panel 172 and for passing from the lower section to the upper section and vice-a-versa. As was previously described, some embodiments of the EMGU 10 will include support components (e.g., the racks) that can be used to support the various items within the container 12 during transport. In some embodiments, the ladder 174 may be used as such a support component. For instance, the rotor blades 26 and/or the struts 64 may be supported within the container 12 via the ladder 174, which can act as a rack or a shelf.

The upper section of the interior of the container 12 may be used as a living quarters for the operator, and may include a bed/cot, a desk, chairs, or the like. The upper section may also include lights and electrical plugs for powering various types of equipment and tools. Such plugs may be powered by one or more dedicated batteries from the energy storage subsystem 80. Alternatively, the plugs may receive power directly from the wind turbine 14 and/or the combustion generator 70. If dedicated batteries are used, such dedicated batteries may also be used to provide power to the various components of the electronic control system, to ensure continual operation of the EMGU 10. In some embodiments, the door assembly 40 may additionally include a small access hatch (not shown) that allows an operator to access the wind turbine 14 from the upper section of the interior of the container 12. As such, the operator can easily access the wind turbine 14 to perform any required maintenance or repairs. The grate material from which the flooring panel 172 is formed should be of sufficient strength and durability to support the various types of equipment that may be installed in the upper section, such as communications equipment (e.g., satellite ground station, Ethernet networks, Wi-Fi networks, etc.), water desalinization/purification pumps, or other similar components.

In some embodiments, the EMGU 10 will include one or more climate control features for maintaining an appropriate temperature within the container 12. Because of the electronic equipment within the container 12, a relatively cool temperature may be required to be maintained, such that the electronics equipment does not need to be "de-rated." Particularly for the energy storage subsystem 80 (e.g., batteries) and the inverter 96, the temperature in the container 12 must be maintained at a temperature between about −55-85 degrees Fahrenheit (13-29 degrees Celsius) to ensure that such electrical components remain operational for their intended life expectancies. To accomplish such climate control, and with reference to FIGS. 11-12, the EMGU 10 may include one or more louvers 180 to allow for air to flow between outside and inside the container 12. In particular, the container 12 may include louvers 180 positioned on a bottom portion of the container 12 and on a top portion (as referenced with the container 12 in the operational configuration of FIGS. 11-12). As such, warm air within the container can rise and exit from the louvers 180 on the top portion of the container 12, while relatively cooler air from outside the container 12 can enter from the louvers 180 on the bottom portion of the container 12. In some additional embodiments, the container 12 may also include fans or air conditioning units to assist with the maintaining of the appropriate temperature within the container 12. In still further embodiments, the container 12 will include air filters and/or dehumidifiers to reduce particulates and humidity inside the container 12. The container 12 may be also include on or more thermostats for automatically controlling the operation of the louvers 180, fans, air conditioning units, and the like, based on temperatures within the container.

Given the EMGU 10 described above, embodiments of the present invention provide a unit, system, and method for supplying stable and reliable electrical power to various systems, machines, buildings, or the like. For instance, the EMGU 10 can be implemented to operate water wells, to provide operation of water desalinization/purification plants, or the like. Alternatively, the EMGU 10 can be used to power a small village's electrical needs, such as home lighting, home HVAC, emergency equipment power, or the like. The EMGU 10 can serve as a constant and reliable source of electrical power for rural health clinics, theatres, libraries, schools, or for the storage of perishable foods and medicines. In additional embodiments, the EMGU 10 may be operable to act as an external charging station for small batteries which can then be carried away to power home lights, computers, and cooking sources. For instance, the EMGU 10 may provide 12 volt DC, 24 volt DC, and/or or 48 volt DC outputs for conventional battery charging outside the container 12, such that the EMGU 10 can be configured to operate as an electrical filling station.

As a specific example of the output capabilities of an EMGU 10, by combining the wind turbine 14 with solar panels 72 and the combustion generator 70, the EMGU 10 can produce at minimum a constant 80 amps of electrical power at 110 volts A.C. Such an output can serve a typical American home's electrical power requirement. The EMGU 10 can be scaled up to a 200 amperage output by increasing the swept area of the wind turbine 14 and/or increasing the number of solar panels 72 in the solar array. As such, the EMGU 10 is capable of providing various different voltage outputs for different hookup needs ranging from 480 volt 3-phase A.C. down to 6 volt D.C. outputs. The production and load calculations of the EMGU 10 take into account the typical diurnal loss of solar power and at least some wind power drop, typical at night. As such, with an assumed eight hour night and also under the assumption that heavy power demands are not generally required after midnight, an EMGU having an energy storage subsystem 80 comprised of forty-eight conventional 12 volt lead/acid batteries that have been charged by the wind turbine 14 and solar panels 72 will be capable of storing adequate energy for a typical night energy lull. For example for each container's 12 charge per day, 30 Alaskan rural homes can have 8 hours of battery sufficiency so that the diesel generators that normally supply rural Alaskan power can be silenced for the evening hours. If an unlikely period of cloud and calm arise simultaneously, the combustion generator 70 may be relied upon as a backup to provide electrical power to the loads and to simultaneously charge the energy storage subsystem 80 back up to full capacity.

The EMGU 10 can be implemented as a single unit, or as previously mentioned, a plurality of EMGUs 10 can be incorporated together to increase overall amperage available for providing a larger service area micro-grid unit system. For instance, with reference to FIG. 14, embodiments of the present invention also include a multi-EMGU system 190 comprising two or more EMGUs 10 each electrically connected to at least one mobile energy storage unit 192. The multi-EMGU system 190 can be used, for example, in instance when more electrical power is required than is available via a single EMGU 10. Furthermore, the mobile energy storage unit 192 allows the electrical energy generated from the EMGUs 10 to be stored and transported to locations that may be physically separated from the location at which the EMGUs 10 are positioned.

Figure 14:
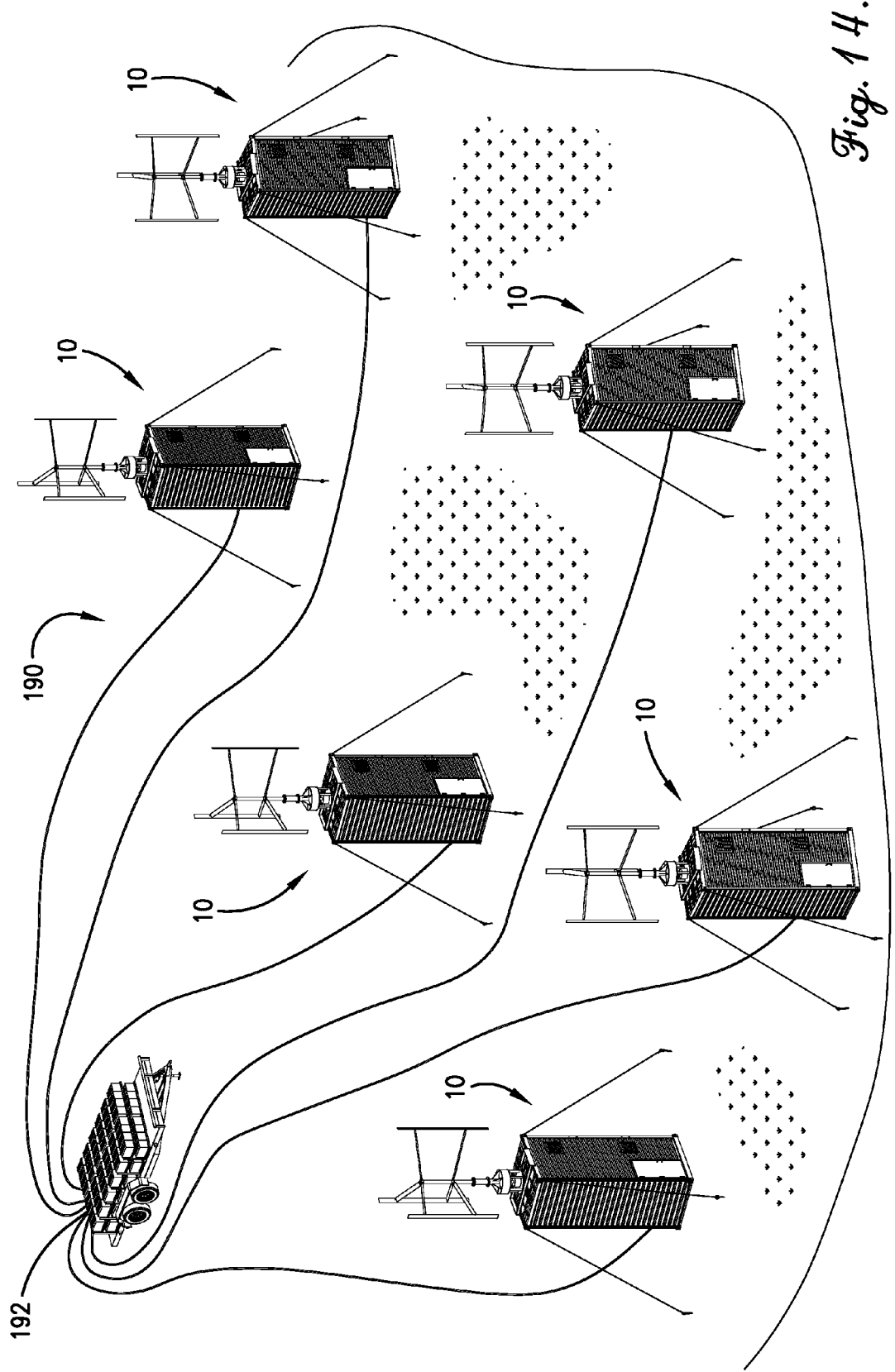
FIG. 14 is an illustration of a multi-EMGU system having a plurality of EMGUs each electrically connected to a mobile energy storage unit.

The mobile energy storage unit 192 may comprise one or more individual battery units supported on a wheeled-vehicle. The wheeled-vehicle may provide an enclosed space for housing the battery units, such that the battery units are protected from the elements. In other embodiments, such as shown in FIG. 14, the wheeled vehicle may support the battery units without completely enclosing them. In some embodiments, the battery units may comprise a plurality of standard 12 volt lead-acid batteries. For instance, in some embodiments, the battery units may comprise 48, 96, 192, or more lead-acid 12 volt batteries. In other embodiments, the battery units may be selected from one or more of the following types of batteries: sodium-sulfur batteries, lithium-ion batteries, lithium-cadmium batteries, lithium membrane batteries, nanophosphate-lithium batteries, vanadium redox flow batteries, zinc-chlorine redox flow batteries, metal slurry batteries, liquid metal batteries, fuel cells, or the like or combinations thereof. As such, the mobile energy storage unit 192 may be configured to store at least 50 kWh, 100 kWh, 150 kWh, or 200 kWh of electrical energy, or alternatively in some embodiments, up to 0.5 MWh, 1 MWh, 2 MWh, 5 MWh, or more of electrical energy. The wheeled-vehicle of the mobile energy storage unit 192 on which the battery units are supported may comprise a wheeled trailer that can be pulled by a vehicle, such as a car, a truck, tractor, heavy-equipment, or the like. For instance, the wheeled-vehicle may comprise a dolly trailer, a hitch-type flatbed trailer, a $5^{th}$-wheel-type flatbed trailer, a box trailer, a low boy-type trailer, or the like. In some alternative embodiments, the wheeled-vehicle may be self-propelled, such as a truck or a tractor with an integrated flat bed.

In some embodiments of the present invention, the multi-EMGU system 190 may also include a shared power management unit (not shown), which receives the electrical energy generated from the EMGUs 10 and appropriately conditions the electrical energy for storage in the mobile energy storage unit 192 or for distribution directly to a load. For instance, the shared power management unit may include inverters, charge controllers, rectifiers, or the like, which may all be commonly shared by the individual EMGUs 10. As such, the shared power management unit may be electrically connected with each of the EMGUs 10 via electrically conductive wires, cables, or the like. Similarly, the shared power management system will be electrically connected to the mobile energy storage unit 192 or to a load. Given the shared power management unit described above, each of the individual EMGUs 10 will not be required to include its own energy storage subsystem 80 and/or power management subsystem 82, thereby reducing cost, weight, maintenance, and support requirements of the EMGUs 10.

In operation, the multi-EMGU system 190 can be used to generate electrical energy at a first location where such energy can be efficiently generated and to transport such generated energy to a second location where the electrical energy is needed. For instance, the multi-EMGU system 190 may be used to provide power to a remote area that does not have immediate access to electrical power or to wind energy. As a specific example, the multi-EMGU system 190 may be used to provide power to a remote village located in a valley. Due to its remoteness, the village may not have access to a power grid infrastructure. Additionally, due to its location in a valley, the village may not have access to natural winds sufficient for the wind turbines of the EMGUs 10 to generate electrical energy. Nevertheless, multi-EMGU system 190 may be capable of providing electrical power to the remote village. In more detail, and with reference to FIG. 14, two or more EMGUs 10 (e.g., six EMGUs 10 in FIG. 14) may be erected on a hilltop that is adjacent to the valley in which the village is located. Each of the EMGUs 10 may be transported to the hilltop in the transportation configuration and transitioned to the operational configuration, as was previously described. In addition, the mobile energy storage unit 192 can be transported to the hilltop and electrically connected to each of the EMGUs 10 via electrically conductive wires, cables, or the like. Because the hilltop is at a higher elevation than the valley in which the village is located, the hilltop will have access to higher amounts of natural winds. As such, the wind turbines 14 of the EMGUs 10 can generate electrical energy from the natural winds, and such electrical energy can be transmitted to and stored in the mobile energy storage unit 192. When the mobile energy storage unit 192 has reached its maximum capacity of electrical energy, or when the electrical energy from the mobile energy storage unit 192 is otherwise needed, the mobile energy storage unit 192 can be disconnected from the EMGUs 10 and transported to the village in the valley where the electrical energy can be used. Once the mobile energy storage unit 192 has exhausted it stored energy at the village, it can be transported back to the hilltop where it can be re-charged by the EMGUs 10. It should be understood that the above illustration was only exemplary, and the multi-EMGU system 190 can be used generally to generate electrical energy at any type of first location and to transport such electrical energy to any type of second location for use. In addition to the above, embodiments of the present invention also contemplate that other energy generation systems may be incorporated with the EMGU 10. For instance, a hydro-power system or a trash gasification system may be used as an additional, or standby or emergency back-up, source of electrical energy for providing larger power outputs. Additionally, the container 12 may be configured to carry other various types of equipment and/or machinery that may be required to operate the EMGU 10. For instance, the container 12 may also be configured to receive the components of the water desalinization/purification system. The desalinization/purification system may provide extra weight to the EMGU 10, which may be beneficial for stabilizing the container 12 when it is positioned upright, with the EMGU 10 in the operational configuration. The container 12 may also house extra fuel for the combustion generator 70. Fencing components may also be stored in the container 12, with such fencing components capable of securing a perimeter about the EMGU 10 when in the operational configuration.

Although the invention has been described with reference to the preferred embodiment illustrated in the attached drawing figures, it is noted that equivalents may be employed and substitutions made herein without departing from the scope of the invention as recited in the claims. For instance, in an alternative embodiment, an open topped container may be used, with such open topped container not having a roof panel. Such an open-topped container may typically be covered with a heavy tarp that can act as the roof when the container is in transit and when a wind turbine is erected. To erect the wind turbine for the open-topped container configuration, a large flange, such as a steel plate, may be mounted within the container, with the flange spanning the width of the container's floor panel. The large flange can support the wind turbine which may be erected out from the open-top using a hydraulic jack system. The hydraulic jack system, which may be similar to that employed in a telescoping "pitless" elevator, can be used to lift a series of poles, which can be used to serve as the jack's extension arms and as the extension components of the wind turbine's central shaft. The jack system can be actuated via a hand pump, or a simple "come along" mounted to the container. As such, the turbine assembly and generator assembly of the wind turbine can be raised to final height. It may be preferred to mount the wind turbine's rotor blades as the wind turbine is being erected so as to avoid the need to assemble the rotor blades when the wind turbine is at its fully erected height.

What is claimed:

1. An energy unit, wherein the unit is capable of being configured in a transportation configuration and in an operational configuration, the unit comprising:
    a container having first and second ends opposing a longitudinally-extending central section, wherein the container presents an exterior surface and an interior space, and wherein in the operational configuration the container is configured to be positioned with the first end on a supporting ground surface such that the second end is set apart in an upward direction from the supporting ground surface; and
    a wind turbine for generating electrical energy from wind, with the wind turbine including—
        a central shaft having a lower portion and an upper portion, wherein the central shaft is configured to be received within the interior space of the container in the transportation configuration and configured to extend from the exterior surface of the container in the operational configuration,
        at least one rotor blade configured to be received within the container in the transportation configuration and configured to be secured to the central shaft in the operational configuration,
        a generator configured to be received within the container in the transportation configuration and configured to be associated with the central shaft in the operational configuration.

2. The energy unit of claim 1, wherein the generator is configured to be secured to the second end of the container in the operational configuration.

3. The energy unit of claim 2, wherein the second end of the container comprises a door assembly.

4. The energy unit of claim 2, wherein the central shaft is configured to be secured to the generator in the operational configuration.

5. The energy unit of claim 1, wherein the container has a length of at least 6.10 meters.

6. The energy unit of claim 1, further comprising an energy storage system received within the interior space of the container for storing the electrical energy generated by the wind turbine.

7. The energy unit of claim 6, wherein the energy storage system comprises a plurality of batteries.

8. The energy unit of claim 6, further comprising an inverter for inverting an output of the energy storage system for use with an electrical grid.

9. The energy unit of claim 1, further comprising a combustion generator configured to be received within the interior space of the container in the transportation configuration and configured to be positioned outside of the container in the operational configuration.

10. The energy unit of claim 1, further comprising one or more solar panels configured to be received within the interior space of the container in the transportation configuration and configured to be positioned outside of the container in the operational configuration.

11. The energy unit of claim 1, further comprising transportable foundation, wherein with the energy unit in the operational configuration, the transportable foundation is configured to be positioned between the supporting ground surface and the first end of the container.

12. An energy micro-grid system, the system comprising:
    at least two energy units operable to be configured in a transportation configuration and in an operational configuration, wherein each of said energy units include— a container presenting an exterior surface and an interior space, and a wind turbine for generating electrical energy from wind, wherein the wind turbine is configured to be received within the interior space of the container in the transportation configuration and configured to extend from the exterior surface of the container in the operational configuration; and an energy storage unit electrically connected to each of the energy units, such that the energy storage unit is configured to store at least a portion of the electrical energy generated by the wind turbines.

13. The system of claim 12, wherein the energy storage unit is mobile.

14. The system claim 13, wherein energy storage unit is wheeled.

15. The system of claim 2, wherein with energy storage unit comprises a plurality of lead-acid 12 volt batteries.

16. The system of claim 12, wherein the energy storage unit is configured to store at least 100 kWh of electrical energy.

17. The lifting system of claim 12, wherein with the container includes first and second ends opposing a longitudinal central section, wherein in the operational configuration the container is configured to be positioned with the first end on a supporting ground surface such that the second end is set apart in an upward direction from the supporting ground surface, and wherein the wind turbine is configured to extend from the second end of the container in the operational configuration.

18. A method for transitioning an energy unit from a transportation configuration to an operational configuration, the method comprising the steps of:

providing a container having first and second ends opposing a longitudinally-extending central section, with the container being configured to house wind turbine components;

positioning the container in the transportation configuration such that its central section is orientated generally parallel with a supporting ground surface;

securing the wind turbine components to an exterior of the container such that the wind turbine components extend from the second end of the container; and shifting the energy unit from the transportation configuration to the operational configuration, such that the container's central section is orientated generally perpendicular with the supporting ground surface and such that the first end of the container is positioned on the supporting ground surface.

19. The method of claim 18, further comprising the step of securing the container in the operational configuration via guy wires extending from the second end of the container to the ground surface.

* * * * *